United States Patent [19]
Nakamura et al.

[11] Patent Number: 6,145,338
[45] Date of Patent: Nov. 14, 2000

[54] HIGH-TEMPERATURE REGENERATOR

[75] Inventors: Makoto Nakamura; Atsushi Shitara, both of Kanagawa-ken; Hidetoshi Arima, Gunma-ken; Hitoshi Kanuma, Saitama-ken; Masahiro Furukawa; Eiichi Enomoto, both of Gunma-ken; Toshihiro Yamada, Osaka-fu, all of Japan

[73] Assignee: Sanyo Electric Co., Ltd., Osaka-Fu, Japan

[21] Appl. No.: 09/169,787

[22] Filed: Oct. 9, 1998

Related U.S. Application Data

[62] Division of application No. 08/848,117, Apr. 28, 1997, Pat. No. 5,862,679.

[30] Foreign Application Priority Data

Apr. 30, 1996 [JP] Japan ................................. 8-109699
Apr. 30, 1996 [JP] Japan ................................. 8-109707

[51] Int. Cl.⁷ ............................................. F25B 33/00
[52] U.S. Cl. .................................................... 62/497
[58] Field of Search ..................... 62/497, 476; 122/19, 122/155.2, 155.3, 188, 190; 432/180

[56] References Cited

U.S. PATENT DOCUMENTS

| | | | |
|---|---|---|---|
| 5,381,674 | 1/1995 | Omori et al. | 62/497 |
| 5,435,154 | 7/1995 | Nishiguchi et al. | 62/476 |
| 5,704,225 | 1/1998 | Sawakura et al. | 62/497 |
| 5,770,711 | 6/1998 | Greene et al. | 536/18.6 |
| 5,771,711 | 6/1998 | Kubota | 62/497 |

*Primary Examiner*—William Doerrler
*Attorney, Agent, or Firm*—Weingarten, Schurgin, Gagnebin & Hayes LLP

[57] ABSTRACT

In a high-temperature regenerator which has vertical liquid pipe groups in the proximity of which a combustion flame and combustion gas from a burner pass and a double can wall which communicates with upper and lower portions of liquid pipes forming the vertical liquid pipe groups and is arranged at a position of a furnace wall and which heats and concentrates a diluted absorption solution passing through the vertical liquid pipe groups and the double can wall, a solution inlet for sprinkling the diluted absorption solution in an open state is provided above liquid pipes arranged on a side opposite to the burner. Since the sprinkled diluted absorption solution collects the heat of an exhaust gas while it falls to increase its temperature, when it flows into the other liquid pipes, it boils immediately and its circulation flow is activated by boiling. Therefore, total heat transfer coefficient can be increased, a local rise in the temperature of the liquid pipe groups and the can wall can be avoided, and such inconvenience as a corrosion accident and the crystallization of a solution caused by this rise in temperature can be prevented.

3 Claims, 20 Drawing Sheets

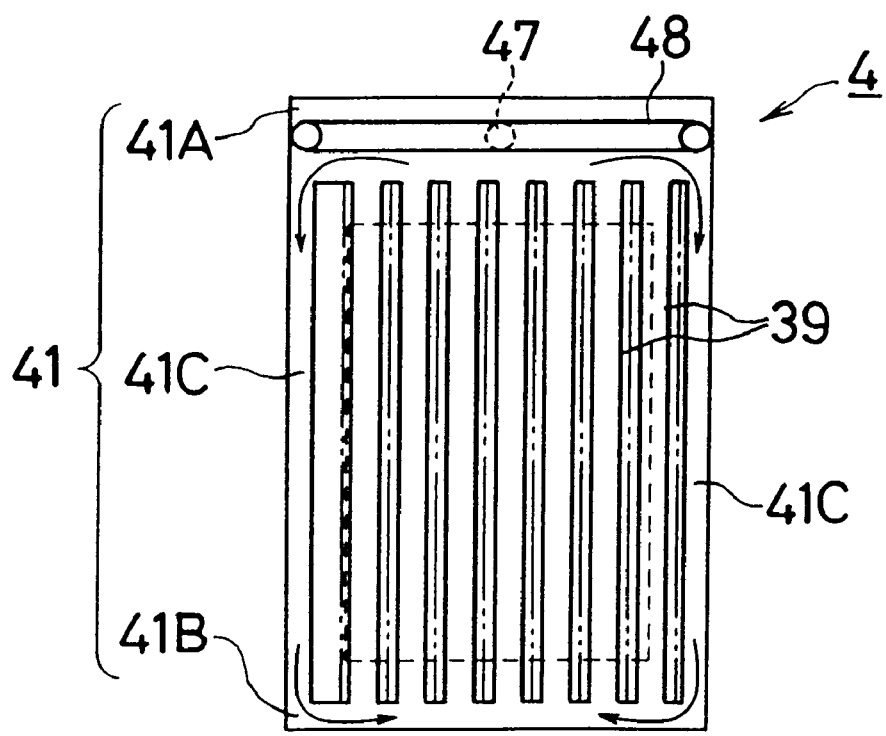

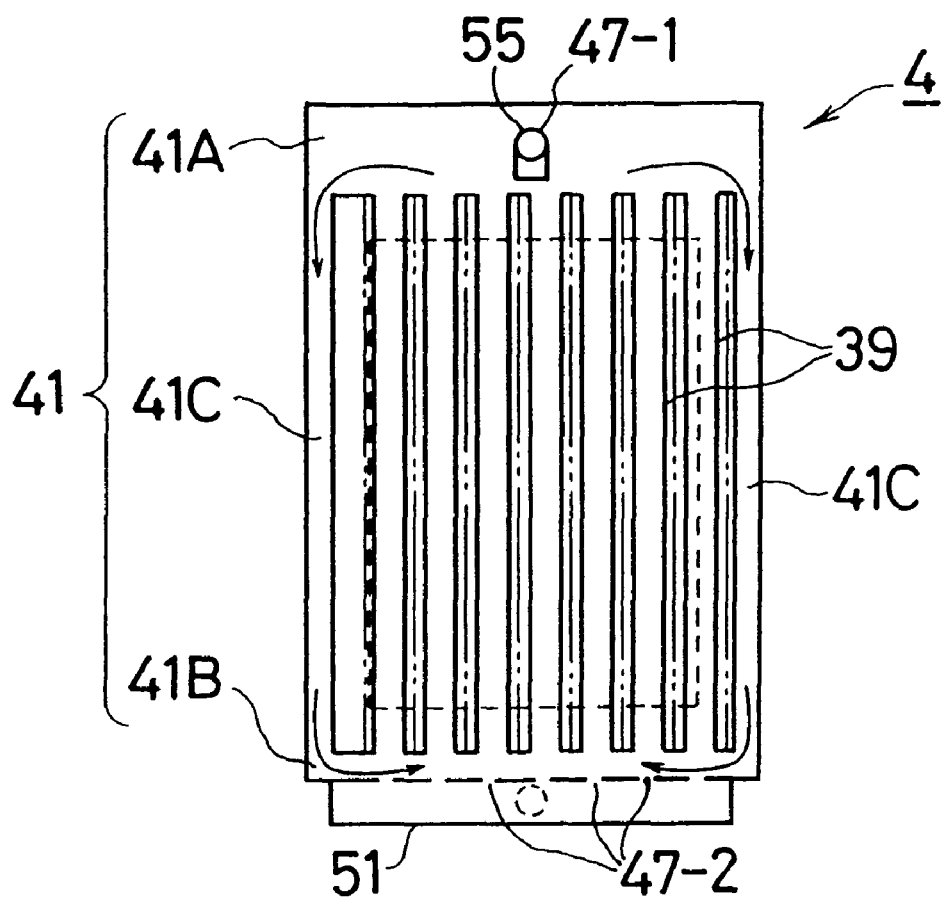

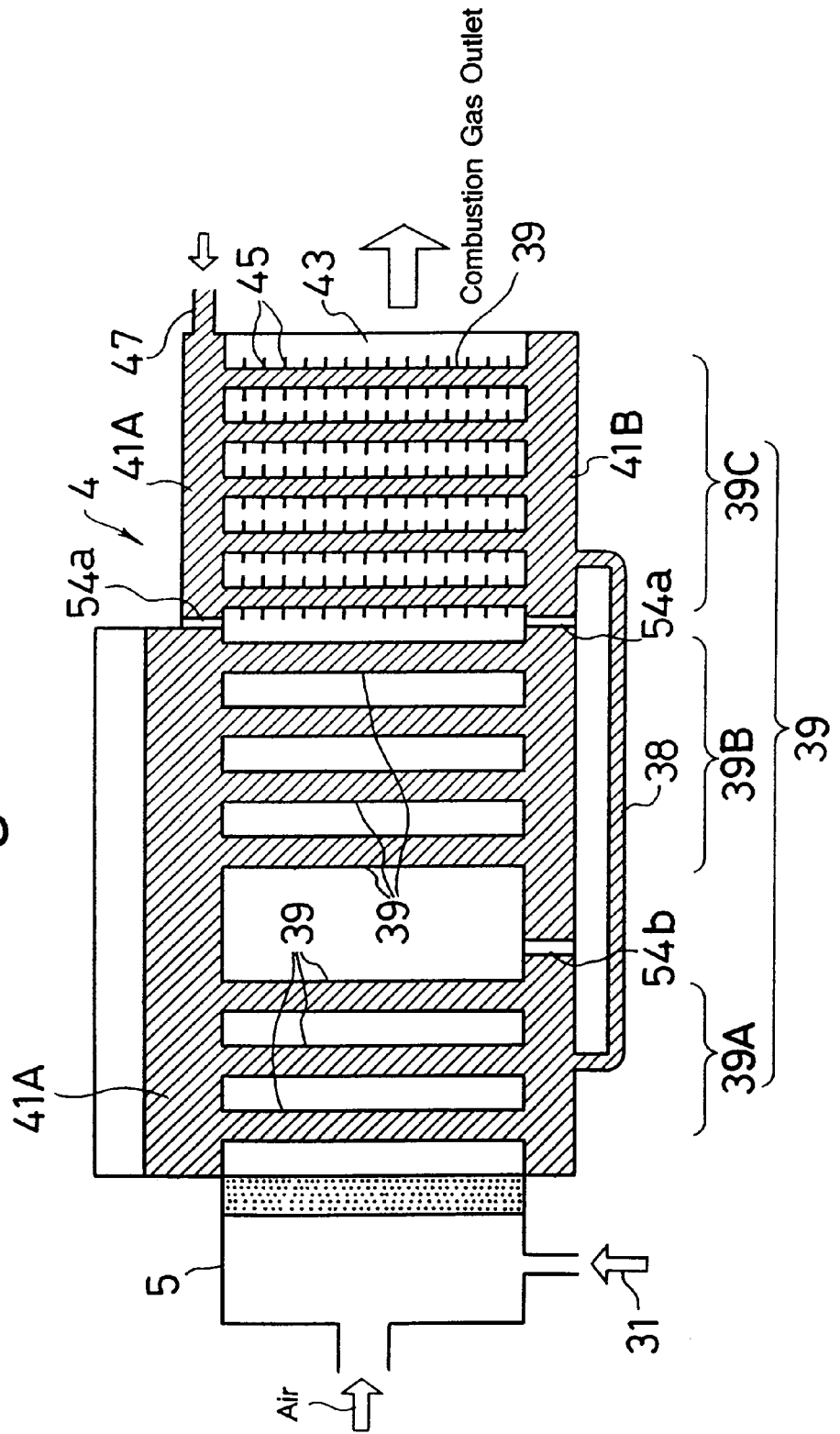

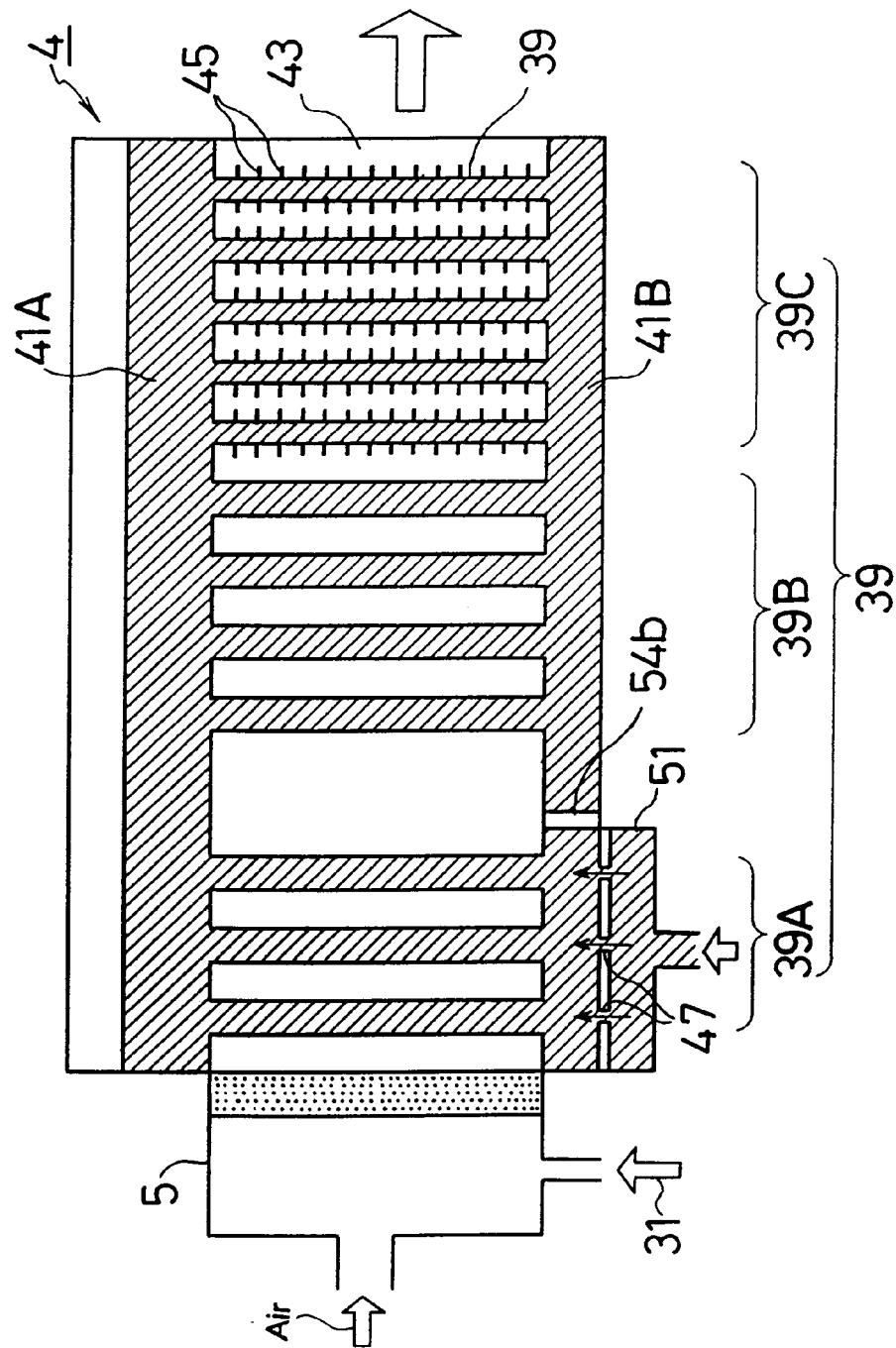

HIGH-TEMPERATURE REGENERATOR

This application is a Division of Ser. No. 08/848,117 Apr. 28, 1997 U.S. Pat. No. 5,862,679.

BACKGROUND OF THE INVENTION

1. Field of the Invention

This invention relates to the structure of a high-temperature regenerator for use in an absorption refrigerator.

2. Background Art

A high-temperature regenerator provided in an absorption refrigerator (including what is called absorption water cooler or heater) takes up the greater part of the entire absorption refrigerator in terms of weight and volume. Therefore, to make compact the absorption refrigerator, it is essential to reduce the size and weight of this high-temperature regenerator. It is also necessary to reduce the discharge of NOx at the time of combustion as an environmental problem in the high-temperature regenerator.

Conventional high-temperature regenerators generally employ a flue and smoke tube system or a flue and liquid tube system. Since it is impossible for the high-temperature regenerators of these systems to eliminate a combustion chamber as a flue, it is difficult to make compact these types of high-temperature regenerators. In other words, the discharge of NOx cannot be reduced when the high-temperature regenerator is made compact, and reductions in the size and weight of the high-temperature regenerator conflict with a reduction in the discharge of NOx.

As what breaks through the limitation of the flue and smoke tube system or the flue and liquid tube system, a flue-less liquid pipe group system in which a plane combustion surface is formed without a combustion chamber has been introduced into a gas fired boiler in recent years. In this flue-less liquid pipe group system, since a combustion flame and combustion gas from a burner such as a plane combustion surface are directly introduced into liquid pipe groups, a combustion chamber is not required, thereby making it possible to make the boiler extremely compact and reduce the discharge of NOx.

However, in the above flue-less liquid pipe group system, a combustion flame and combustion gas from the burner pass in the proximity of the liquid pipe groups. Therefore, the exterior surfaces of the liquid pipes are covered with high-temperature flames and further the heat transfer coefficient of an absorption solution in the pipes is greatly reduced as compared with water, whereby the temperature of the interior wall surface of each pipe is locally increased. As a result, such inconvenience as a corrosion accident or the crystallization of a solution may occur by the local overheating and concentration of an absorption solution caused by a local rise in temperature.

SUMMARY OF THE INVENTION

It is therefore an object of the present invention which has been made to solve the above problems to provide a high-temperature regenerator of a flue-less liquid pipe group system having no combustion chamber but liquid pipe groups in the proximity of which a combustion flame and combustion gas pass, which can prevent inconvenience caused by a local rise in temperature.

To attain the above object, according to a first aspect of the present invention, there is provided a high-temperature regenerator which has vertical liquid pipe groups in the proximity of which a combustion flame and combustion gas from a burner pass and a double can wall which communicates with upper and lower portions of liquid pipes forming the vertical liquid pipe groups and is arranged at a position of a furnace wall and which heats and concentrates a diluted absorption solution passing through the vertical liquid pipe groups and the double can wall, wherein a solution inlet for sprinkling the diluted absorption solution in an open state is provided above liquid pipes arranged on a side opposite to the burner.

According to a second aspect of the present invention, there is provided a high-temperature regenerator which has vertical liquid pipe groups in the proximity of which a combustion flame and combustion gas from a burner pass and a double can wall which communicates with upper and lower portions of liquid pipes forming the vertical liquid pipe groups and is arranged at a position of a furnace wall and which heats and concentrates a diluted absorption solution passing through the vertical liquid pipe groups and the double can wall, wherein solution inlets for sprinkling the diluted absorption solution in an open state are provided in upper portions of both right and left sides or an upper portion of either one of the sides of a portion on a side opposite to the burner of the double can wall.

According to a third aspect of the present invention, there is provided a high-temperature regenerator which has vertical liquid pipe groups in the proximity of which a combustion flame and combustion gas from a burner pass and a double can wall which communicates with upper and lower portions of liquid pipes forming the vertical liquid pipe groups and is arranged at a position of a furnace wall and which heats and concentrates a diluted absorption solution passing through the vertical liquid pipe groups and the double can wall, wherein solution inlets for sprinkling the diluted absorption solution in an open state are distributed in a longitudinal direction of upper portions of both right and left sides or an upper portion of either one of the sides of the double can wall.

According to a fourth aspect of the present invention, there is provided a high-temperature regenerator which has vertical liquid pipe groups in the proximity of which a combustion flame and combustion gas from a burner pass and a double can wall which communicates with upper and lower portions of liquid pipes forming the vertical liquid pipe groups and is arranged at a position of a furnace wall and which heats and concentrates a diluted absorption solution passing through the vertical liquid pipe groups and the double can wall, wherein solution inlets for causing the diluted absorption solution to flow in by means of pump pressure are provided below liquid pipes arranged on the side of the burner.

According to a fifth aspect of the present invention, there is provided a high-temperature regenerator which has vertical liquid pipe groups in the proximity of which a combustion flame and combustion gas from a burner pass and a double can wall which communicates with upper and lower portions of liquid pipes forming the vertical liquid pipe groups and is arranged at a position of a furnace wall and which heats and concentrates a diluted absorption solution passing through the vertical liquid pipe groups and the double can wall, wherein first solution inlets for causing the diluted absorption solution to flow in by means of pump pressure are provided below liquid pipes arranged on the side of the burner, and a second solution inlet for sprinkling the diluted absorption solution in an open state is provided above liquid pipes arranged on a side opposite to the burner, or in upper portions of both right and left sides or an upper portion of either one of the sides of a portion on a side opposite to the burner of the double can wall, or distributed in a longitudinal direction of upper portions of both right and left sides or an upper portion of either one of the sides of the double can wall.

According to a sixth aspect of the present invention, there is provided a high-temperature regenerator which has vertical liquid pipe groups in the proximity of which a combustion flame and combustion gas from a burner pass and a double can wall which communicates with upper and lower portions of liquid pipes forming the vertical liquid pipe groups and is arranged at a position of a furnace wall and which heats and concentrates a diluted absorption solution passing through the vertical liquid pipe groups and the double can wall, wherein the high-temperature regenerator comprises:

dividing means for dividing the liquid pipes into liquid pipes arranged on the side of the burner and liquid pipes arranged at a downstream side thereof so that they do not communicate with each other;

solution inlets for causing the diluted absorption solution to flow into lower portions of liquid pipes on the side of the burner by means of pump pressure; and sprinkling means for sprinkling the diluted absorption solution flowing out from upper portions of the liquid pipes on the side of the burner over upper portions of the liquid pipes at a downstream side in an open state.

According to a seventh aspect of the present invention, there is provided a high-temperature regenerator which has vertical liquid pipe groups in the proximity of which a combustion flame and combustion gas from a burner pass and a double can wall which communicates with upper and lower portions of liquid pipes forming the vertical liquid pipe groups and is arranged at a position of a furnace wall and which heats and concentrates a diluted absorption solution passing through the vertical liquid pipe groups and the double can wall, wherein the high-temperature regenerator comprises:

dividing means for dividing the liquid pipes into liquid pipes arranged on the side of the burner and liquid pipes arranged at a downstream side thereof so that they do not communicate with each other;

first solution inlets for causing the diluted absorption solution to flow into lower portions of the liquid pipes on the side of the burner by means of pump pressure;

a second solution inlet for sprinkling the diluted absorption solution over upper portions of the liquid pipes at a downstream side; and sprinkling means for sprinkling the diluted absorption solution flowing out from upper portions of the liquid pipes on the side of the burner over upper portions of the liquid pipes at a downstream side in an open state.

According to an eighth aspect of the present invention, there is provided a high-temperature regenerator which has vertical liquid pipe groups in the proximity of which a combustion flame and combustion gas from a burner pass and a double can wall which communicates with upper and lower portions of liquid pipes forming the vertical liquid pipe groups and is arranged at a position of a furnace wall and which heats and concentrates a diluted absorption solution passing through the vertical liquid pipe groups and the double can wall, the high-temperature regenerator comprises:

dividing means for dividing the vertical liquid pipes into a first group close to the burner, a second group farther from the burner than the first group and through which a high-temperature combustion gas passes, and a third group, father from the burner than the second group and provided on the side of the outlet of the combustion gas, for collecting the heat of an exhaust gas so that the liquid pipes of the first and second groups do not communicate with each other in lower portions thereof and the liquid pipes of the second and third groups do not communicate with each other in a vertical direction;

a solution inlet for supplying the diluted absorption solution into the liquid pipes of the third group; and a bypass route for introducing the diluted absorption solution passing through the liquid pipes of the third group into lower portions of the liquid pipes of the first group.

According to a ninth aspect of the present invention, there is provided a high-temperature regenerator of the fourth, fifth, sixth and seventh aspects, wherein the solution inlets for causing the diluted absorption solution to flow in by means of pump pressure have an introduction structure formed by openings for passing the diluted absorption solution and guide means for regulating an inflow of the diluted absorption solution into side portions of the double can wall and guiding it mainly into lower portions of the liquid pipes.

According to a tenth aspect of the present invention, there is provided a high-temperature regenerator of the ninth aspect, wherein the introduction structure is formed by a box having openings below liquid pipes.

According to an eleventh aspect of the present invention, there is provided a high-temperature regenerator of the ninth aspect, wherein the openings of the introduction structure are smaller than the liquid pipes in inner diameter.

According to a twelfth aspect of the present invention, there is provided a high-temperature regenerator of the eleventh aspect, wherein the openings of the introduction structure project toward the lower portions of the liquid pipes.

These and other objects and advantages of the present invention will become clear by the following description of preferred embodiments of the present invention with reference to the accompanying drawings.

BRIEF DESCRIPTION OF THE DRAWINGS

FIGS. 2A to 2C show key parts of a high-temperature regenerator according to a first aspect of the present invention provided in the absorption refrigerator of FIG. 1, wherein FIG. 2A is a horizontal sectional view, FIG. 2B a vertical sectional front view and FIG. 2C a vertical sectional side view;

FIGS. 3A to 3C show key parts of a high-temperature regenerator according to a second embodiment of the present invention, wherein FIG. 3A is a horizontal sectional view, FIG. 3B a vertical sectional front view and FIG. 3C a vertical sectional side view;

FIGS. 4A to 4C show key parts of a high-temperature regenerator according to a third embodiment of the present invention, wherein FIG. 4A is a horizontal sectional view, FIG. 4B a vertical sectional front view and FIG. 4C a vertical sectional side view;

FIG. 6A to FIG. 6C show key parts of a high-temperature regenerator according to a fourth embodiment of the present invention provided in the absorption refrigerator of FIG. 5, wherein FIG. 6A is a horizontal sectional view, FIG. 6B a vertical sectional front view and FIG. 6C a vertical sectional side view.

FIG. 8A to FIG. 8D show key parts of a high-temperature regenerator according to a fifth embodiment of the present invention provided in the absorption refrigerator of FIG. 7, wherein FIG. 8A is a horizontal sectional view, FIG. 8B a vertical sectional front view, FIG. 8C a vertical sectional side view and FIG. 8D a vertical sectional front view of solution inlets;

FIG. 9A to FIG. 9C show key parts of a high-temperature regenerator according to a sixth embodiment of the present invention, wherein FIG. 9A is a horizontal sectional view, FIG. 9B a vertical sectional front view and FIG. 9C a vertical sectional side view;

FIG. 10A to FIG. 10C show key parts of a high-temperature regenerator according to a seventh embodiment of the present invention, wherein FIG. 10A is a horizontal sectional view, FIG. 10B a vertical sectional front view and FIG. 10C a vertical sectional side view;

FIG. 12A to FIG. 12C show key parts of a high-temperature regenerator according to an eighth embodiment of the present invention, wherein FIG. 12A is a horizontal sectional view, FIG. 12B a vertical sectional front view and FIG. 12C a vertical sectional side view; and FIG. 13A to FIG. 13C show key parts of a high-temperature regenerator according to a ninth embodiment of the present invention, wherein FIG. 13A is a horizontal sectional view, FIG. 13B a vertical sectional front view and FIG. 13C a vertical sectional side view.

DETAILED DESCRIPTION OF THE PREFERRED EMBODIMENTS (First Embodiment)

A first embodiment of the present invention is described hereinunder with reference to FIGS. 1 and 2A to FIG. 2C.

Figure 1:
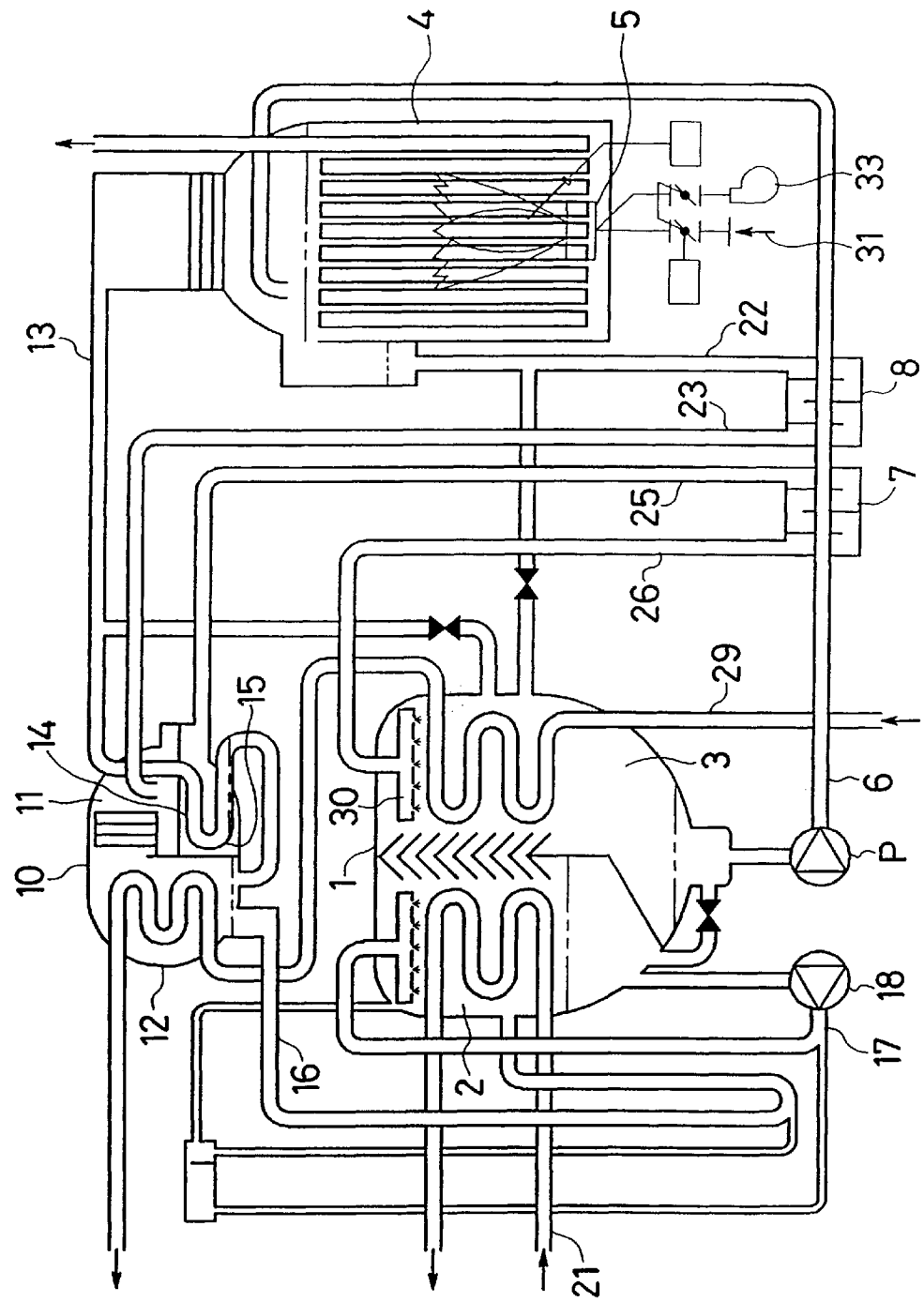
FIG. 1 is a schematic diagram of a whole absorption refrigerator according to first, eighth and ninth aspects of the present invention.

With reference to FIG. 1, the whole configuration of an absorption refrigerator equipped with a high-temperature regenerator according to this embodiment is outlined.

In the figure, reference numeral 1 is the barrel (lower barrel) of an evaporator/absorber, and an evaporator 2 and an absorber 3 are housed in this lower barrel 1. Reference numeral 4 is a high-temperature regenerator according to this embodiment which is equipped with a gas burner 5. An absorption solution pump P, a low-temperature heat exchanger 7 and a high-temperature heat exchanger 8 are provided along a diluted absorption solution pipe 6 which extends from the absorber 3 to the high-temperature regenerator 4.

Reference numeral 10 is an upper barrel, and a low-temperature regenerator 11 and a condenser 12 are housed in the upper barrel 12. Numeral 13 is a refrigerant vapor pipe extending from the high-temperature regenerator 4 to the low-temperature regenerator 11, 16 a refrigerant solution downflow pipe extending from the condenser 12 to the evaporator 2, 17 a refrigerant circulation pipe connected to the evaporator 2, 18 a refrigerant pipe and 21 a cold water pipe connected to the evaporator 2.

Denoted by 22 is an intermediate absorption solution pipe extending from the high-temperature regenerator 4 to the high-temperature heat exchanger 8, 23 an intermediate absorption solution pipe extending from the high-temperature heat exchanger 8 to the low-temperature regenerator 11, 25 a concentrated absorption solution pipe extending from the low-temperature regenerator 11 to the low-temperature heat exchanger 7, 26 a concentrated absorption solution pipe extending from the low-temperature heat exchanger 7 to the absorber 3, and 29 a cooling water pipe.

During the operation of the absorption refrigerator configured as described above, the gas burner 5 of the high-temperature regenerator 4 burns, a diluted absorption solution such as an aqueous solution of lithium bromide (LiBr) (containing a surfactant) flowing from the absorber 3 is heated and boiled, and refrigerant vapor is separated from the diluted absorption solution. Thereby, the diluted absorption solution is concentrated.

The refrigerant vapor flows into the low-temperature regenerator 11 through the refrigerant vapor pipe 13. A refrigerant solution obtained by heating and condensing an intermediate absorption solution from the high-temperature regenerator 4 in the low-temperature regenerator 11 flows into the condenser 12. In the condenser 12, the refrigerant vapor flowing from the low-temperature regenerator 11 condenses and flows down into the evaporator 2 together with the refrigerant solution flowing from the low-temperature regenerator 11.

In the evaporator 2, the refrigerant solution is sprinkled by the operation of the refrigerant pump 18. Then, cold water which is cooled by this sprinkling to lower its temperature is supplied to a load. The refrigerant vapor gasified in the evaporator 2 flows into the absorber 3 and absorbed into the sprinkled absorption solution.

Meanwhile, the intermediate absorption solution whose concentration is increased by the separation of the refrigerant vapor in the high-temperature regenerator 4 flows into the low-temperature regenerator 11 through the intermediate absorption solution pipe 22, the high-temperature heat exchanger 8 and the intermediate absorption solution pipe 23.

The intermediate absorption solution is heated by a heater 14 through which the refrigerant vapor from the high-temperature regenerator 4 flows. The concentration of the absorption solution is further increased by the separation of the refrigerant vapor from the intermediate absorption solution.

The concentrated absorption solution heated and condensed in the low-temperature regenerator 11 flows into the concentrated absorption solution pipe 25 and further into the absorber 3 through the low-temperature heat exchanger 7 and the concentrated absorption solution pipe 26 and drops over a cooling water pipe 29 from a sprinkling unit 30. The concentrated absorption solution absorbs the refrigerant vapor from the evaporator 2 to increase the concentration of the refrigerant contained therein. The absorption solution having an increased concentration of the refrigerant is preheated in the low-temperature heat exchanger 7 and the high-temperature heat exchanger 8 by the drive force of an absorption solution pump P and flows into the high-temperature regenerator 4.

A description is subsequently given of the high-temperature regenerator 4.

As shown in FIG. 1, a fuel gas 31 introduced into a gas burner 5 (to be simply referred to as "burner" hereinafter) of the high-temperature regenerator 4 and air supplied by a blower 33 are mixed together and ignited to start combustion.

Figure 2A:
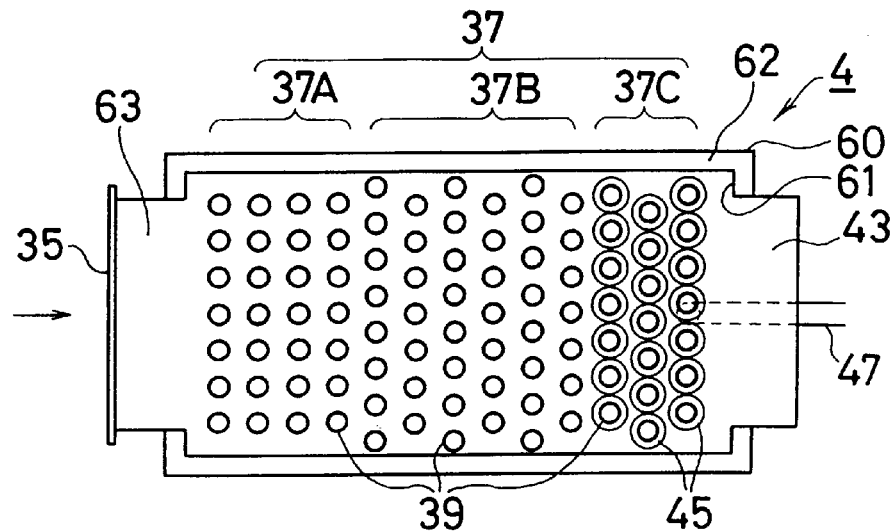
Figure 2B:
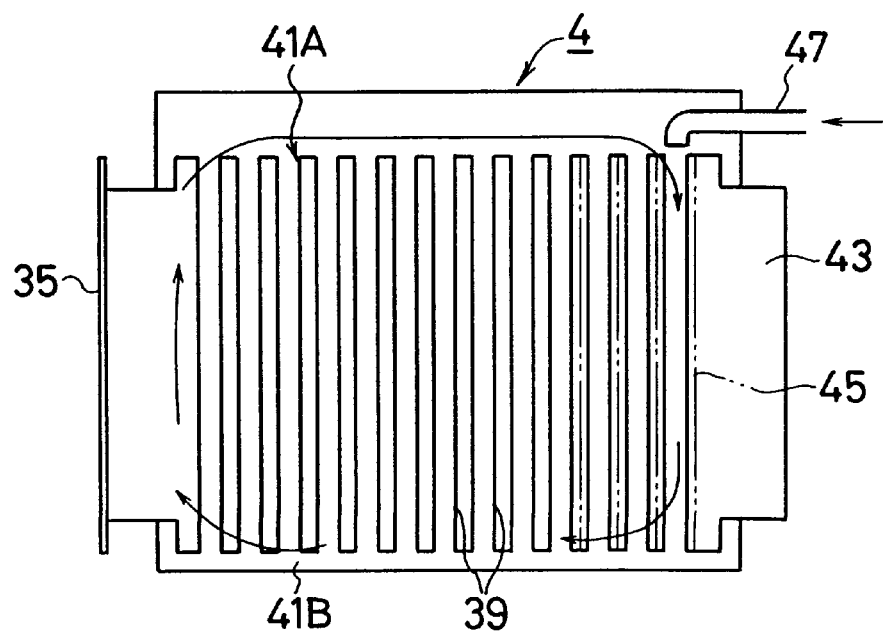
Figure 2C:
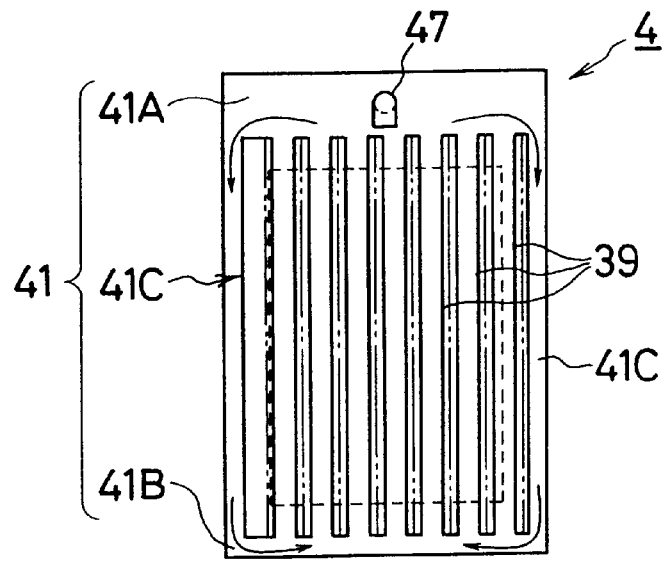

As shown in FIGS. 2A to FIG. 2C, a combustion flame and combustion gas from the burner 5 are blown directly against a large number of vertical liquid pipe groups 37 (37A, 37B and 37C) through a burner inlet 35 and pass in the proximity of the vertical liquid pipe groups 37. Thereby, a flue (combustion chamber) which is required for the conventional flue and smoke tube system and flue and liquid tube system is not necessary, thereby making it possible to make compact the high-temperature regenerator and reduce flame temperature and the discharge of NOx.

As for these vertical liquid pipe groups 37, a large number of liquid pipes 39 are arranged in a vertical direction and a diluted absorption solution flows therethrough. Upper and lower portions of each liquid pipe 39 communicate with a double can wall 41. This can wall 41 is arranged at a position of a furnace wall where a combustion flame and combustion gas pass and has an upper surface portion 41A, a lower surface portion 41B and side surface portions 41C, and the diluted absorption solution passes therethrough.

In other words, as shown in FIGS. 2A to 2C, the diluted absorption solution passes through a space 62 surrounded by an outer shell 60 and an inner shell 61 and the large number of liquid pipes 39 whereas a combustion flame and combustion gas pass through a space 63 surrounded by the inner shell 61.

The vertical liquid pipe groups 37 are divided into three liquid pipe groups 37A, 37B and 37C: a first group 37A of liquid pipes the closest to the burner 5, a second group 37B of liquid pipes slightly far from the burner 5 and a third group 37C farther than the second group 37B of liquid pipes. Therefore, the third group 37C of liquid pipes arranged on a side opposite to the burner 5 are provided on the side of a combustion gas outlet 43 and fins 45 are provided in each liquid pipe 39 so that heat can be collected from a combustion gas which is now an exhaust gas having a slightly lowed temperature.

A diluted absorption solution inlet 47 is provided above the third group 37C of liquid pipes and made open to the atmosphere of an upper portion (gas phase portion) of the upper surface portion 41A of the can wall 41.

The diluted absorption solution flowing into the high-temperature regenerator 4 has passed through the heat exchangers 7 and 8 (FIG. 1) and its temperature has fallen below a boiling start temperature in the high-temperature regenerator 4 due to the characteristics of the heat exchangers 7 and 8. This diluted absorption solution having a low temperature is caused to flow in from above the third group 37C of liquid pipes by the pump pressure of the absorption solution pump P and is sprinkled in an open state.

The sprinkled diluted absorption solution falls through the liquid pipes 39 of the third group 37C and the side surface portions 41C of the can wall 41. At this point, it collects the heat of the exhaust gas and its temperature rises. Thereafter, it flows into the lower surface portion 41B of the can wall 41 communicating with lower portions of the liquid pipes 39 of the third group 37C. The diluted absorption solution which has flowed into the lower surface portion 41B and whose temperature has increased to a point near the boiling start temperature flows into lower portions of the liquid pipes of the second group 37B and the first group 37A, is heated and rises together with the rise of air bubbles generated by boiling in the pipes. Thus, a large circulation flow (shown by arrows in the figures) is formed in the entire high-temperature regenerator.

Since the temperature of the diluted absorption solution increases to a point near the boiling start point (saturation temperature) when the diluted absorption solution falls through the liquid pipes of the third group 37C, it boils immediately in the liquid pipes of the second group 37B and the third group 37C and its circulation flow is activated by boiling. Particularly, it can be boiled entirely from the lower portions of the liquid pipes 39. The circulation flow activated by boiling prevents the retention of the diluted absorption solution and increases total heat transfer coefficient. The diluted absorption solution which is heated uniformly and sufficiently flows out to the outside from an unshown discharge portion.

Heating is carried out uniformly and sufficiently by an increase in heat transfer coefficient due to the activated circulation flow, thereby making it possible to prevent a local rise in temperature in the vertical liquid pipe groups 37 and the can wall 41. Therefore, it is possible to prevent a corrosion accident and the crystallization of a solution which are considered to be caused by overheating due to local heating.

(Second Embodiment)

Figure 3A:
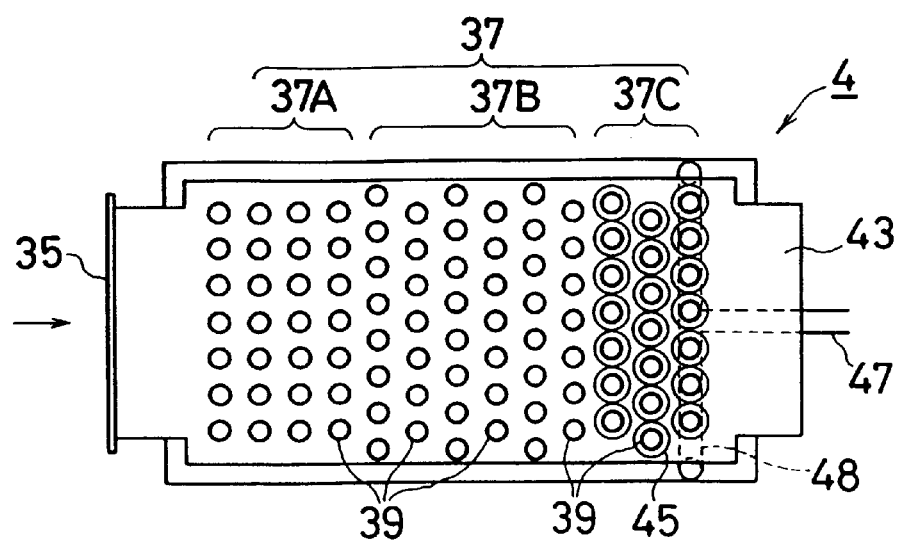
Figure 3B:
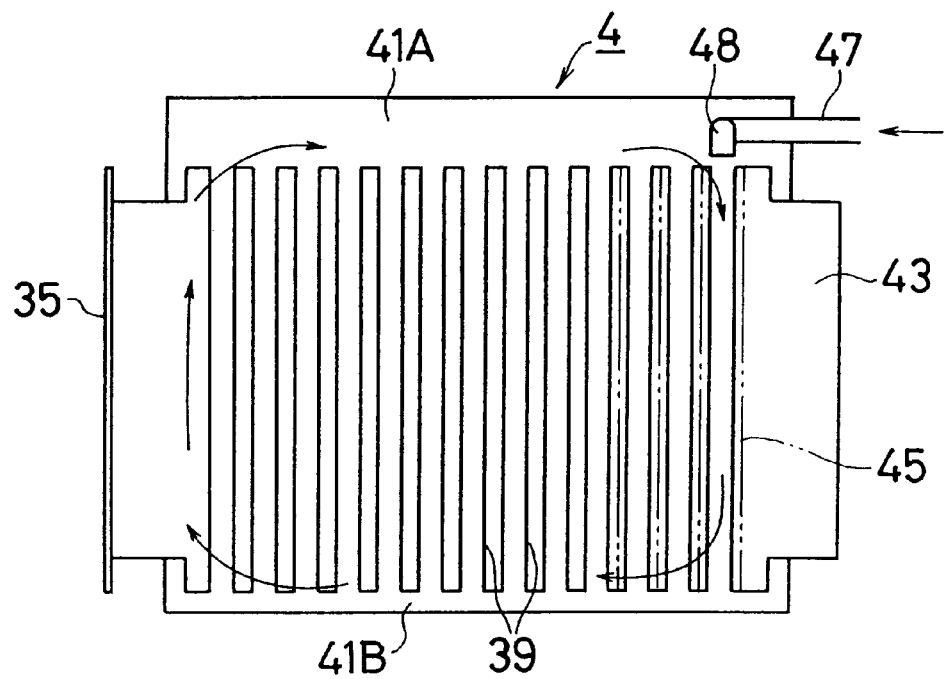
Figure 3C:
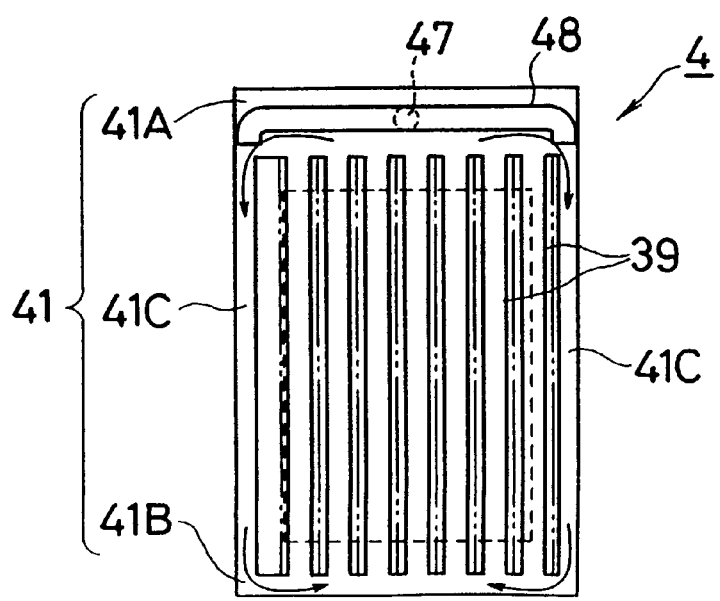

A second embodiment of the present invention is described hereinunder with reference to FIG. 3A to FIG. 3C. Portions having the same functions as those described with reference to the above figures are given the same reference symbols and their descriptions are omitted as far as the understanding of the present invention is not prevented (this also applied to a third embodiment of the present invention to be described later).

In the first embodiment, the solution inlet 47 is provided above the center of the last row of liquid pipes out of a plurality of rows of liquid pipes of the third group 37C (FIG. 2A). In the second embodiment, as shown in FIGS. 3A to 3C, solution inlets 47 may be provided in upper portions of both right and left sides of a portion on a side opposite to the burner 5 of the can wall 41. In other words, a pipe constituting the solution inlet 47 separates into right and left branch pipes 48 by which the diluted absorption solution may be sprinkled over upper portions of the side surface portions 41C on both right and left sides of the can wall 41.

Since the side surface portions 41C of the can wall 41 have a lower temperature than the liquid pipes 39 of the third group 37C owing to their relationship with the combustion gas, they are suitable for forming a downflow of the diluted absorption solution. Therefore, according to this embodiment, a stronger downflow can be obtained and hence, a circulation flow of the diluted absorption solution can be formed more positively.

(Third Embodiment)

Figure 4A:
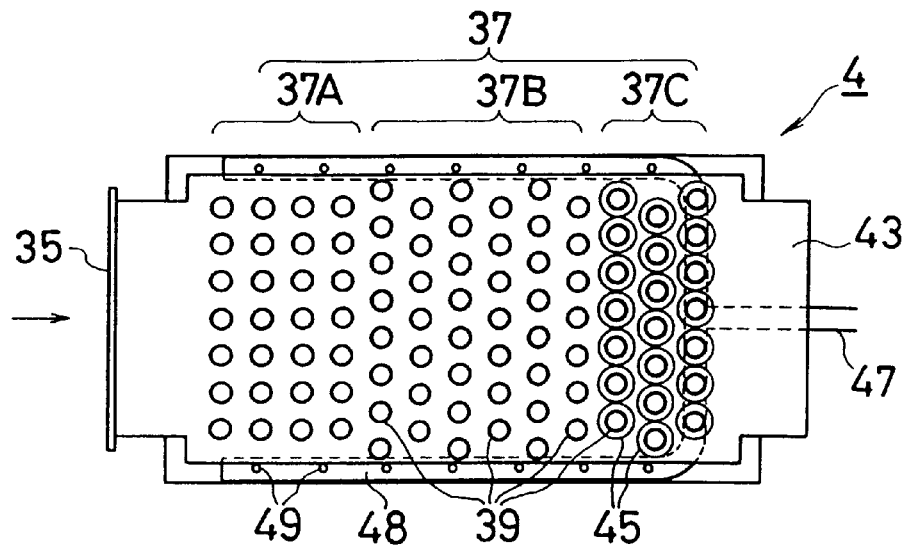
Figure 4B:
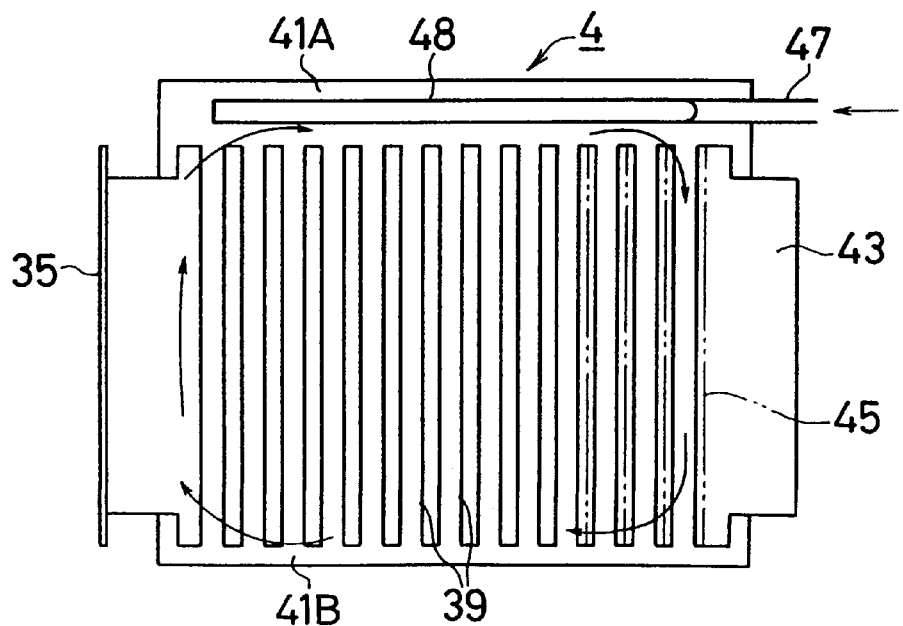

A third embodiment of the present invention is described hereinunder with reference to FIG. 4A to FIG. 4C.

In the above second embodiment, the branch pipes 48 constituting the solution inlet 47 are open, as shown in FIG. 3A to FIG. 3C, at the last row of liquid pipes out of a plurality of liquid pipes of the third group 37C in the flow direction of the combustion gas and at the side surface portions 41C of the can wall 41 in a direction perpendicular to the flow direction of the combustion gas, that is, a horizontal direction.

However, as shown in FIG. 4A to FIG. 4C of the third embodiment, the branch pipe 48 constituting the solution inlet 47 may be bent into a U shape on a plane (FIG. 4A) and laid along upper portions of the side surface portions 41C on both right and left sides of the can wall 41 and a plurality of inlets 49 for sprinkling the diluted absorption solution may be distributed in a longitudinal direction of the branch pipe 48.

Since the side surface portions 41C of the can wall 41 generally have a lower temperature than the liquid pipes 39 of the vertical liquid pipe groups 37 owing to their relationship with the combustion gas, they are suitable for forming a downflow of the diluted absorption solution. Therefore, according to this embodiment, a stronger downflow can be obtained by the side surface portions 41C of the can wall 41 and a circulation flow of the diluted absorption solution can be formed more positively together with an upflow naturally obtained in the vertical liquid pipe groups 37 having a higher temperature.

While the solution inlets 47 in the high-temperature regenerator 4 are provided in upper portions of the side surface portions 41C on both right and left sides of the can wall 41 in the second and third embodiments, a solution inlet may be provided in an upper portion of the side surface portion 41C on either side.

(Fourth Embodiment)

A fourth embodiment of the present invention is described hereinunder with reference to FIG. 5 and FIG. 6A to FIG. 6D.

In the above first to third embodiments, the solution inlet(s) 47 is(are) provided on a side opposite to the burner 5. In the fourth embodiment as shown in FIG. 5 and FIG. 6A to FIG. 6D, the solution inlets 47 may be provided below the first group 37A of liquid pipes arranged on the side of the burner 5.

For instance, the diluted absorption solution is received by a diluted absorption solution inflow box 51 provided below the first group 37A of liquid pipes and flows into lower portions of the liquid pipes 39 of the first group 37A from the solution inlets 47 formed in the diluted absorption solution inflow box 51. Thereafter, the plurality of solution inlets 47 formed in the diluted absorption solution inflow box 51 are formed of nozzles as shown in FIG. 6(D), each of which extends through the outer shell 60 making the lower surface portion 41B of the can wall 41 a double structure and projects into the inside of the double structure of the lower surface portion 41B toward a lower portion of each liquid pipe 39. The projecting nozzles correspond to the number of liquid pipes 39 of the first group 37A. The inner diameter of each of the nozzles is smaller than the inner diameter of each of the liquid pipes 39 of the first group 37A.

Therefore, the diluted absorption solution supplied by pump pressure is sprinkled from the nozzles and flows vigorously only into the lower portions of the liquid pipes 39 of the first group 37A. Thereby, a strong upflow which is combined with an upflow obtained naturally by heating in the first group 37A of liquid pipes is obtained. A circulation flow of the diluted absorption solution can be formed more positively by this upflow and downflows generated in the side surface portions 41C of the can wall 41.

The diluted absorption solution which flows in as a strong upflow has passed through the heat exchangers 7 and 8 (FIG. 5) and its temperature has fallen below the boiling start temperature in the high-temperature regenerator 4 due to the characteristics of the heat exchangers 7 and 8. The temperature of a combustion flame from the burner 5 can be reduced positively and the discharge of NOx contained in the combustion gas can be reduced by this diluted absorption solution having a low temperature.

(Fifth Embodiment)

A fifth embodiment of the present invention is described hereinunder with reference to FIG. 7 and FIG. 8A to FIG. 8C.

In FIG. 1 and FIG. 2A to FIG. 2C of the first embodiment, the solution inlet 47 is provided on a side opposite to the burner 5. In FIG. 5 and FIG. 6A to FIG. 6C of the fourth embodiment, the solution inlets 47 are provided below the first group 37A of liquid pipes arranged on the side of the burner 5. However, as shown in FIG. 7 and FIG. 8A to FIG. 8C of the fifth embodiment, the two different types of solution inlets 47 can be provided.

Figure 7:
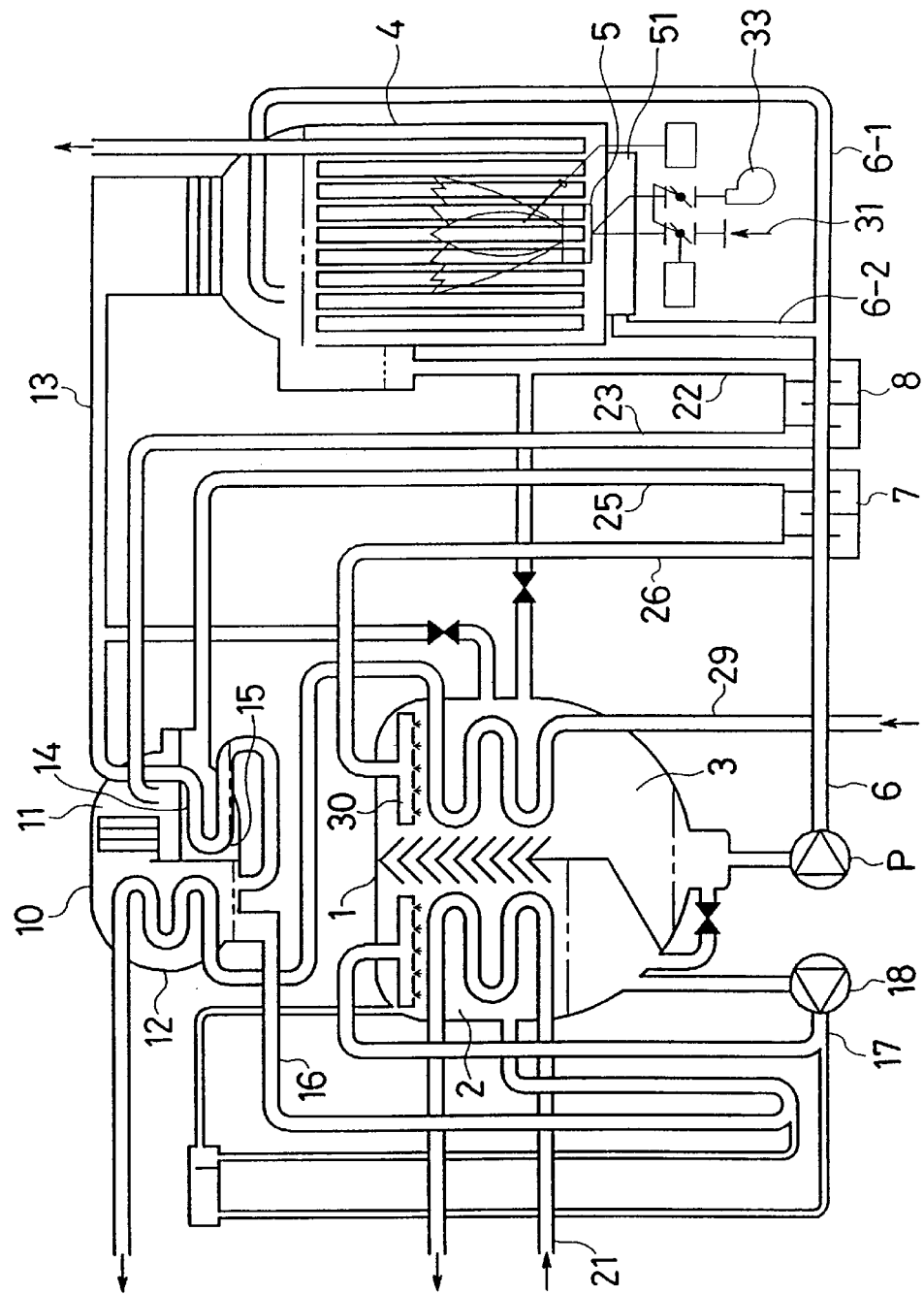
FIG. 7 is a schematic diagram of a whole absorption refrigerator according to fifth and seventh embodiments of the present invention.
Figure 8A:
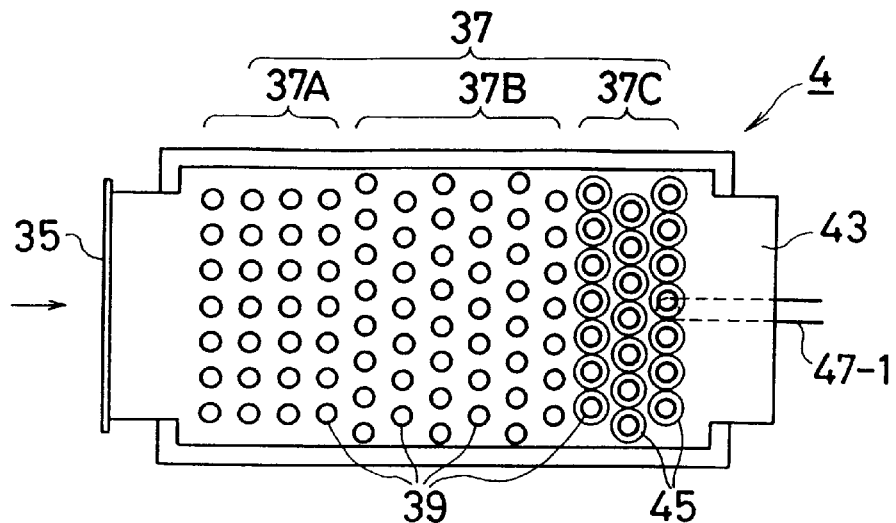
Figure 8B:
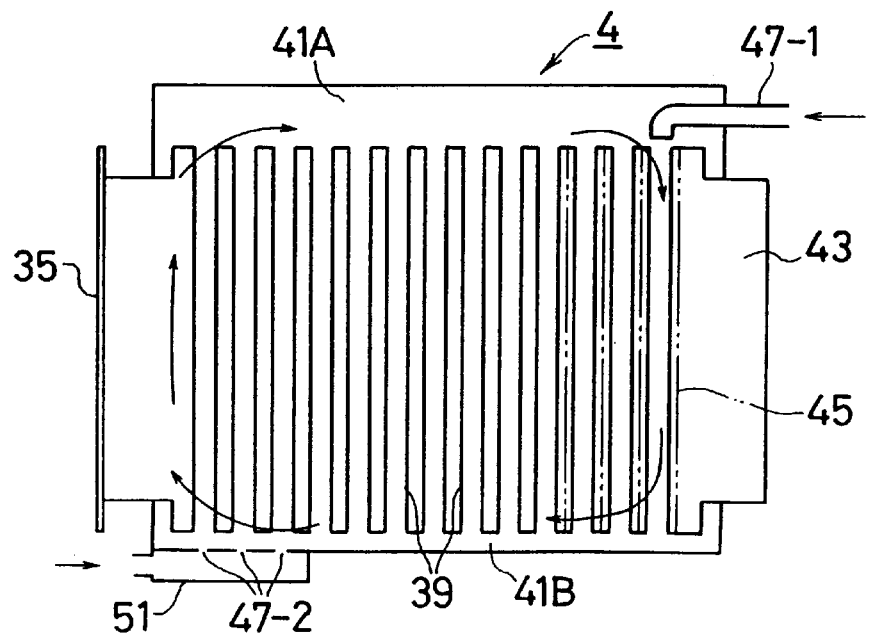
Figure 8C:
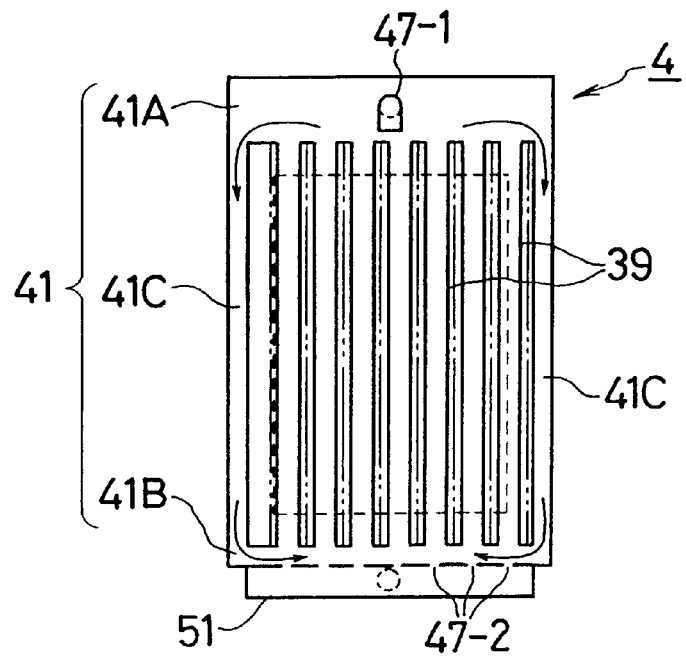
Figure 9A:
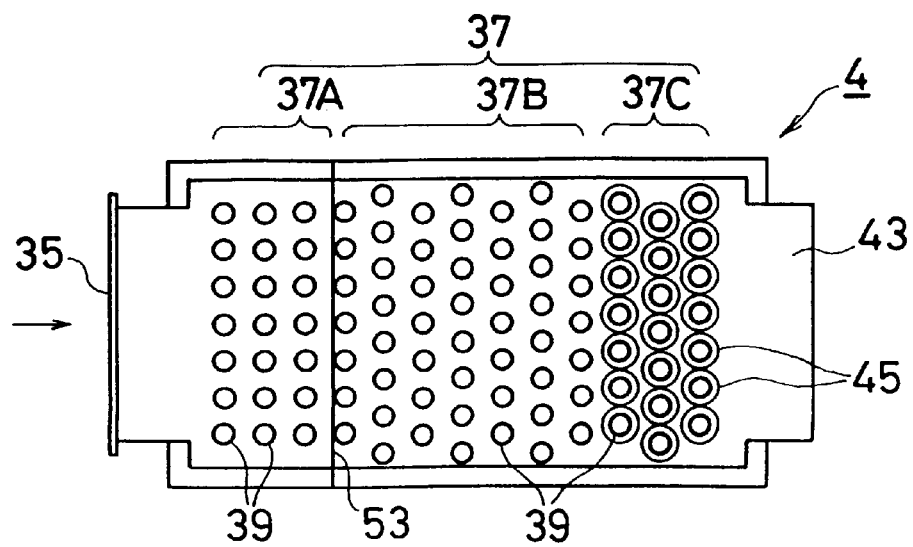
Figure 9B:
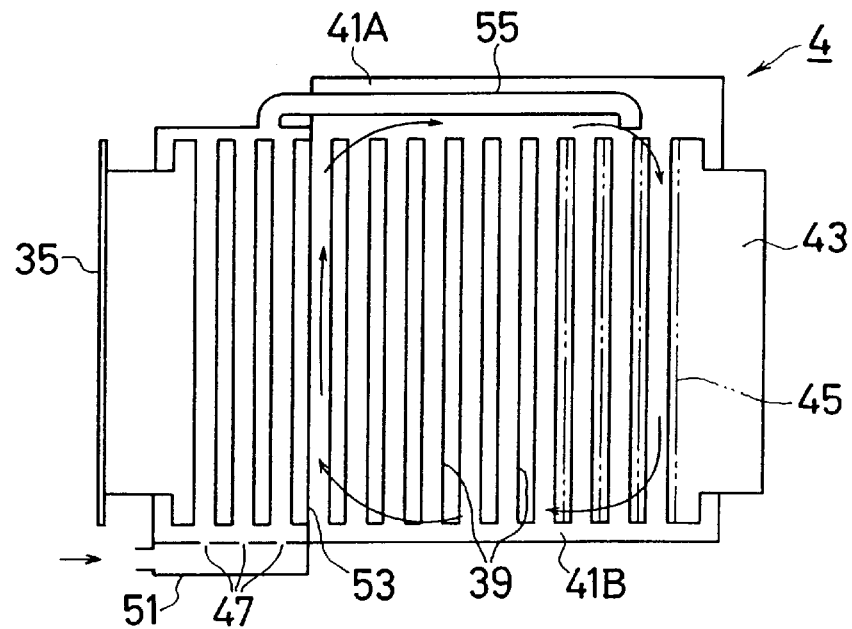
Figure 9C:
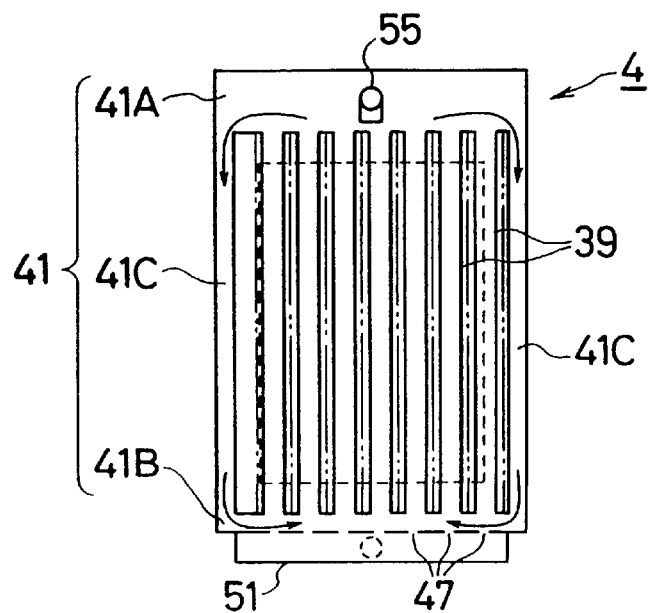
Figure 10A:
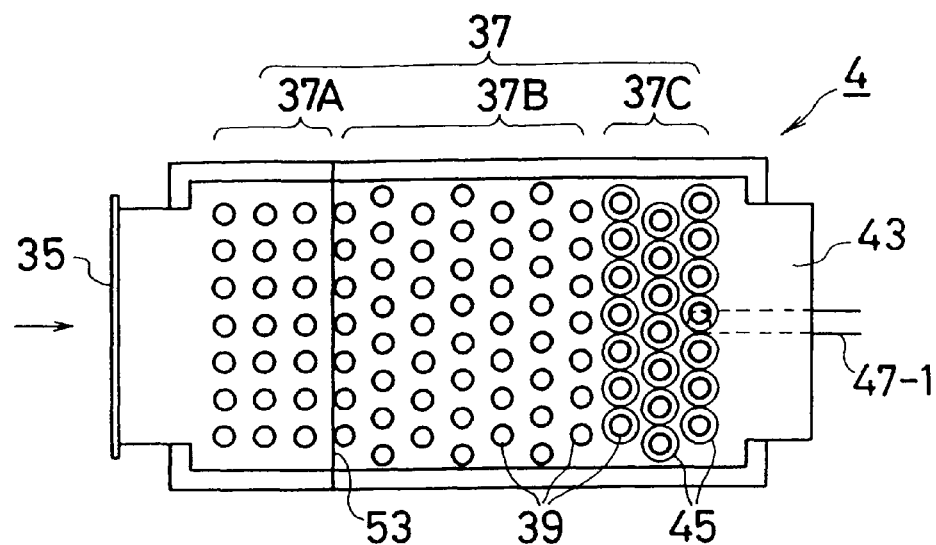
Figure 10B:
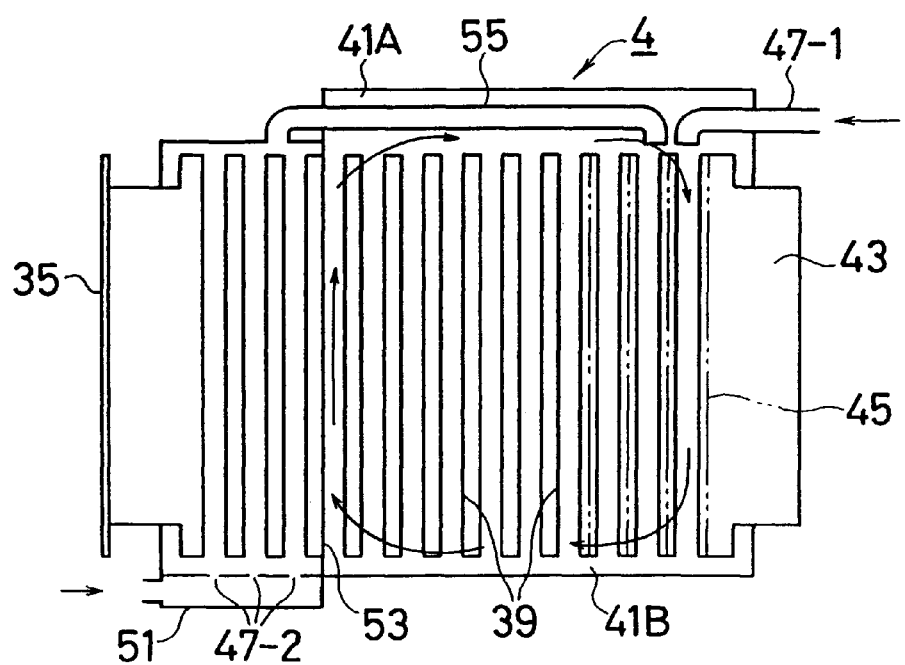

In FIG. 8A to FIG. 8C, the solution inlet 47 of the high-temperature regenerator 4 of the first embodiment is indicated as a solution inlet 47-1 and the solution inlets 47 of the high-temperature regenerator 4 of the fourth embodiment as solution inlets 47-2. In FIG. 7, the diluted absorption solution pipe 6 extending from the absorber 3 to the high-temperature regenerator 4 separates into branch pipes 6-1 and 6-2 which communicate with the solution inlets 47-1 and 47-2, respectively.

Thereby, this embodiment can obtain both effects of the first embodiment and the fourth embodiment.

In FIG. 8A to FIG. 8C, like the first embodiment, the solution inlet 47-1 is provided above the third group 37C of liquid pipes arranged on a side opposite to the burner 5. As a modification, like the second embodiment, the solution inlets 47-1 may be provided in upper portions of both right and left side surface portions 41C or an upper portion of either one of the side surface portions 41C of the can wall 41 on a side opposite to the burner. Like the third embodiment, the solution inlets 47-1 may be distributed in a longitudinal direction of the upper portions of both right and left side surface portions 41C or an upper portion of either one of the side surface portions 41C of the can wall 41.

A flow control valve may be provided in either one of the branch pipes 6-1 and 6-2 to adjust the ratio of the diluted absorption solution to be supplied to the high-temperature regenerator 4 through the solution inlets 47-1 and 47-2 (this applies to the following embodiments to be described later).

(Sixth Embodiment)

A sixth embodiment of the present invention is described hereinunder with reference to FIG. 5 and FIG. 9A to FIG. 9C.

Figure 6A:
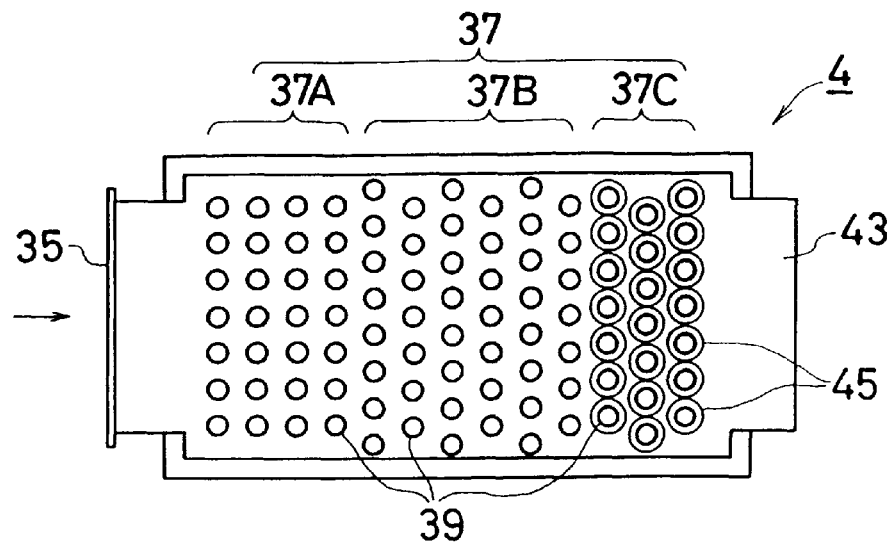
Figure 6B:
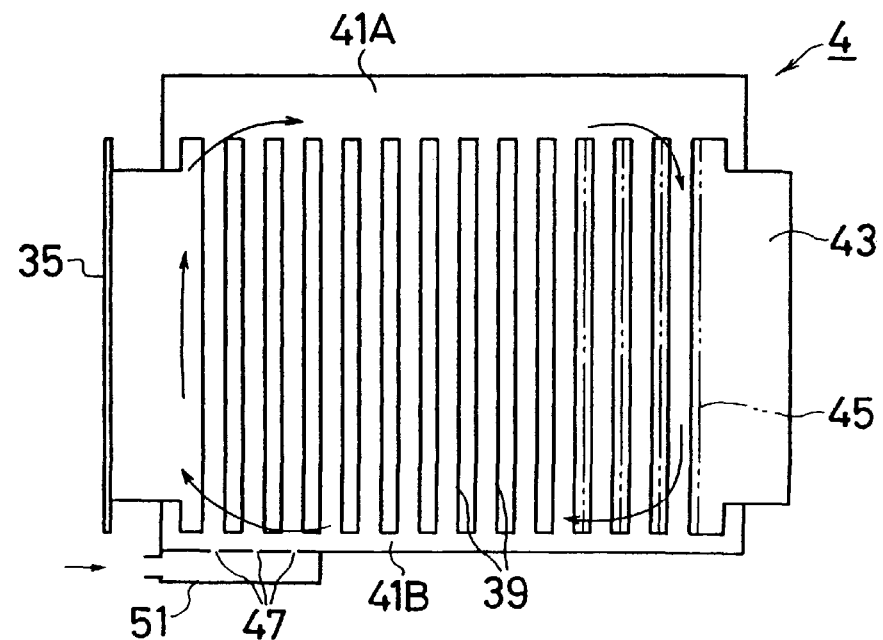
Figure 6C:
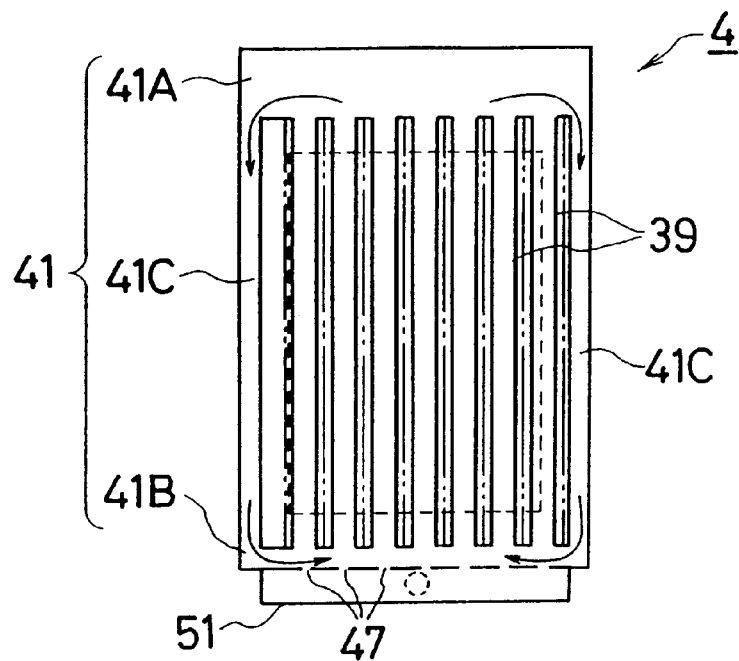
Figure 6D:
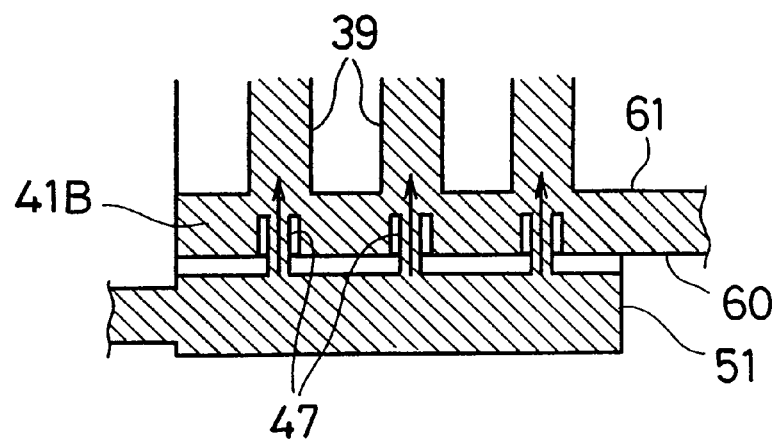

In the above fourth embodiment, the diluted absorption solution flowing into the lower portions of the liquid pipes of the first group 37A flows into upper portions of the liquid pipes of the second group 37B and the third group 37C communicating with each other in a closed state from upper portions of the liquid pipes of the first group 37A (FIG. 6A to FIG. 6C). However, in the sixth embodiment, the diluted absorption solution is sprinkled and caused to flow from upper portions of the liquid pipes of the first group 37A into upper portions of the liquid pipes of the third group 37C in an open state.

In other words, the can wall 41 around the first group 37A of liquid pipes is separated from the can wall 41 around the other second group 37B and third group 37C by a partition wall 53. The upper surface portion 41A of the can wall 41 around the first group 37A communicates with a sprinkling pipe 55 extending through the partition wall 53 and the sprinkling pipe 55 extends in the upper surface portion 41A of the can wall 41 surrounding the second group 37B and third group 37C of liquid pipes and is open to upper portions of the liquid pipes of the third group 37C. Thereby, the diluted absorption solution is sprinkled and caused to flow into the upper portions of the liquid pipes of the third group 37C in an open state.

Figure 5:
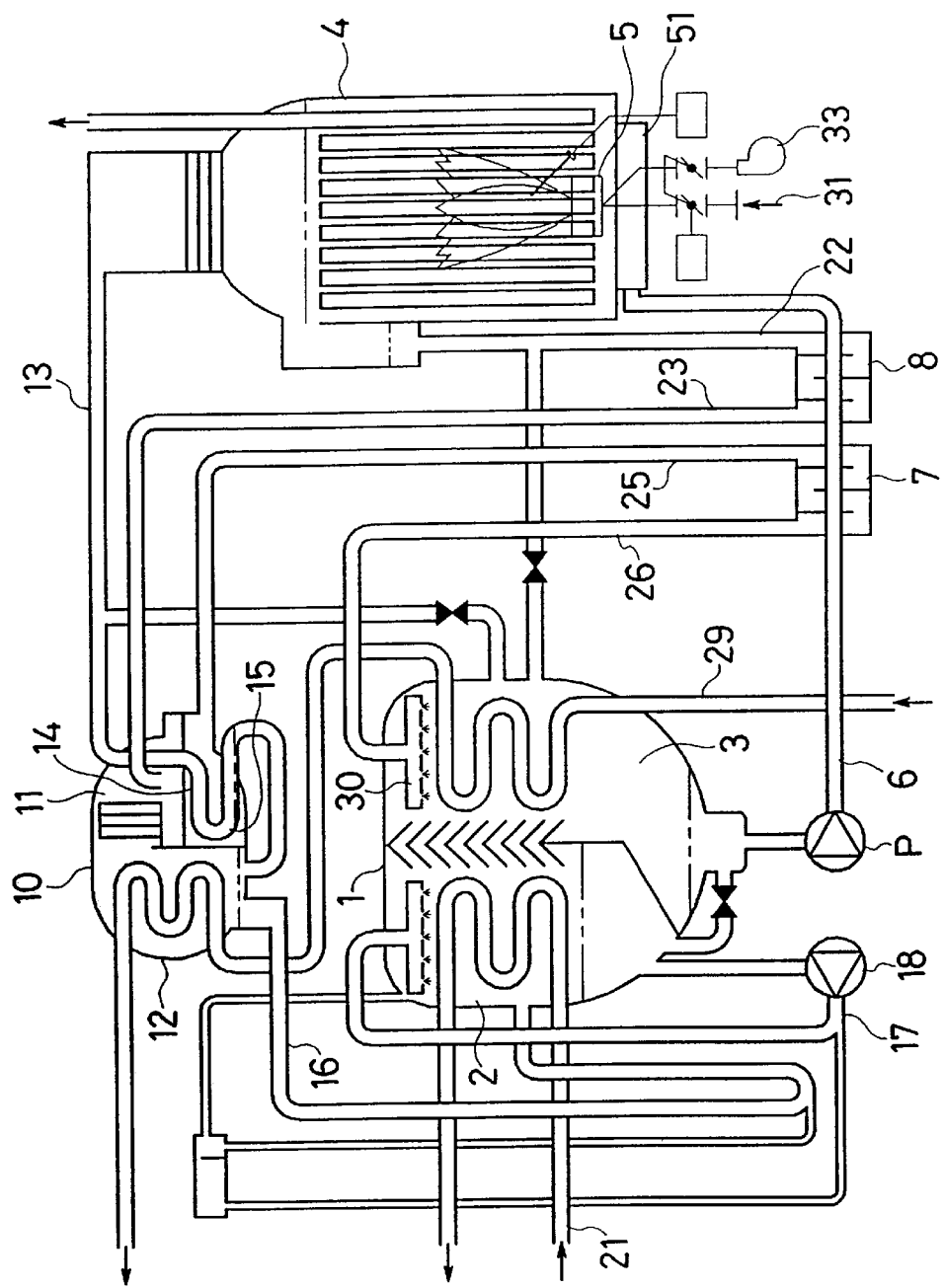
FIG. 5 is a schematic diagram of a whole absorption refrigerator according to fourth and sixth embodiments of the present invention.

According to this sixth embodiment, the total amount of the diluted absorption solution which has passed the high-temperature heat exchanger 8 flows into lower portions of liquid pipes of the first group 37A through the diluted absorption solution inflow box 51 as shown in FIG. 5.

According to this sixth embodiment, in addition to the effects of the fourth embodiment, the following effects can be obtained. That is, the first group 37A of liquid pipes functions as a preheater and sprinkles and flows the diluted absorption solution flowing in by pump pressure into upper portions of the liquid pipes of the third group 37C in an open state, thereby making it possible to promote the generation of refrigerant vapor. By the function of the partition wall 53, it is possible to cause the diluted absorption solution having a low temperature to stay in the proximity of the first group 37A of liquid pipes sufficiently, lower the temperature of a combustion flame more sufficiently, and further reduce the discharge of NOx.

(Seventh Embodiment)

A seventh embodiment of the present invention is described hereinunder with reference to FIG. 7 and FIG. 10A to FIG. 10C.

In the above sixth embodiment, the total amount of the diluted absorption solution which has passed the high-temperature heat exchanger 8 flows into lower portions of the liquid pipes of the first group 37A. However, in this seventh embodiment, part of the diluted absorption solution flows into lower portions of the liquid pipes of the first group 37A and the other part is sprinkled over upper portions of the liquid pipes of the third group 37C in an open state.

In other words, in FIG. 7, the diluted absorption solution pipe 6 extending from the absorber 3 to the high-temperature regenerator 4 separates into branch pipes 6-1 and 6-2, whereby the diluted absorption solution from the high-temperature heat exchanger 8 is divided, part of the divided diluted absorption solution is caused to flow in from the solution inlet 47-1 and the other part from the solution inlets 47-2. The diluted absorption solution which flows in from the solution inlets 47-2 and flows out from upper portions of the liquid pipes of the first group 37A is sprinkled over upper portions of the liquid pipes of the third group 37C together with the other part of the diluted absorption solution which flows in from the solution inlet 47-1.

Thereby, the amount of the diluted absorption solution flowing in from the solution inlets 47-2 can be adjusted, thereby making it possible to control the degree of a reduction in the temperature of a combustion flames According to this embodiment, the diluted absorption solution is sprinkled in an open state over upper portions of the liquid pipes of the third group 37C, that is, upper portions of the liquid pipes 39 arranged on a side opposite to the burner, out of the vertical liquid pipe groups 37. As a modification, like the second embodiment, the diluted absorption solution may be sprinkled over the upper portions of both right and left side surface portions 41C or an upper portion of either one of the side surface portions 41C on a side opposite to the burner of the can wall 41. Like the third embodiment, it may be sprinkled over locations distributed in a longitudinal direction of upper portions of both right and left side surface portions 41C or an upper portion of either one of the side surface portions 41C of the can wall 41.

Figure 11:
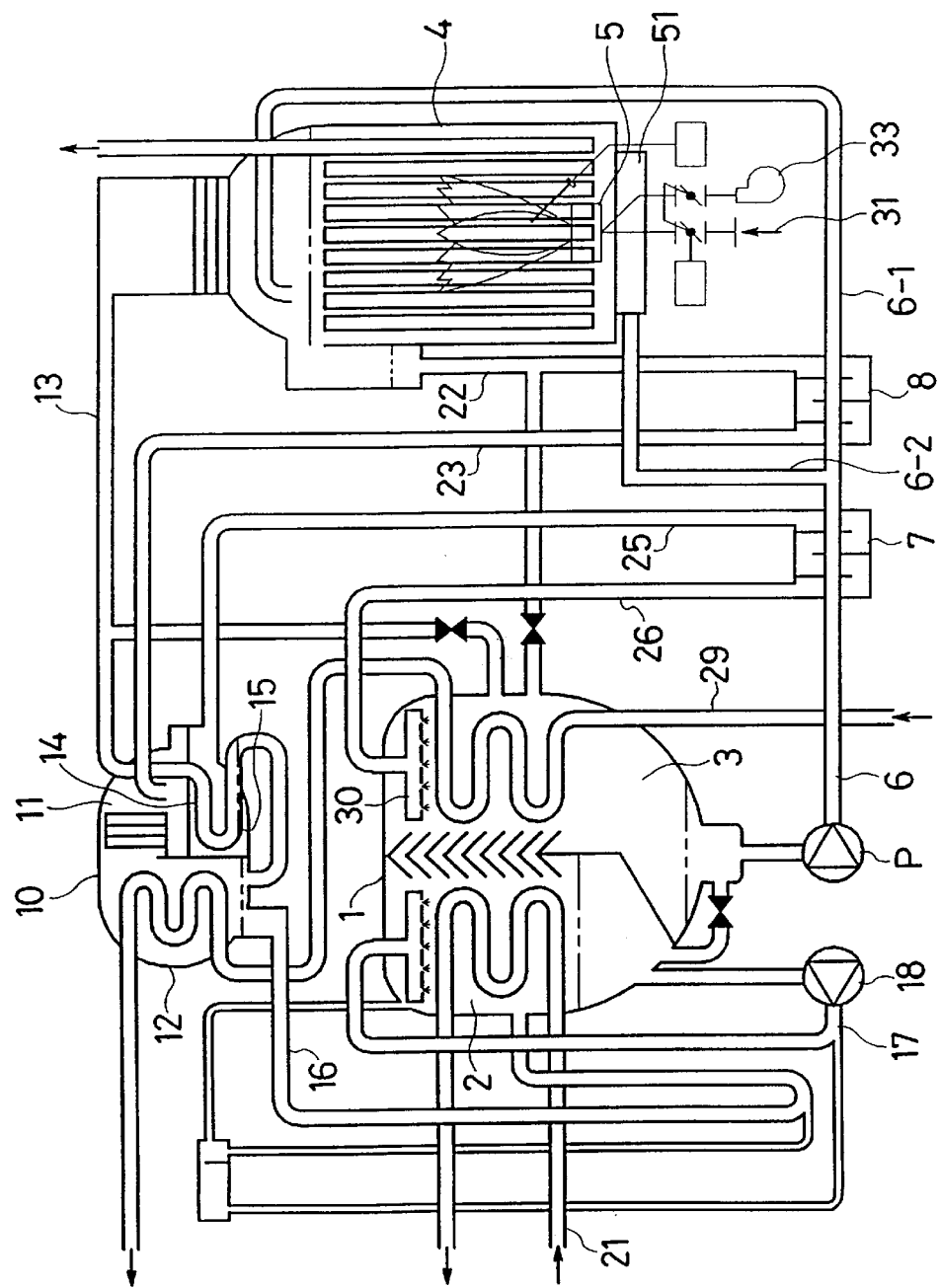
FIG. 11 is a schematic diagram of an absorption refrigerator showing another use example of a high-temperature regenerator according to fifth and seventh aspects of the present invention.
Figure 12B:
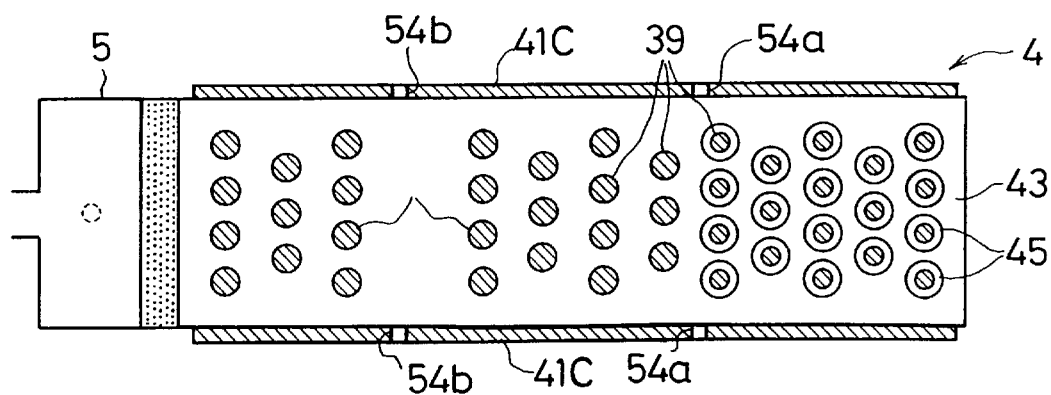
Figure 12C:
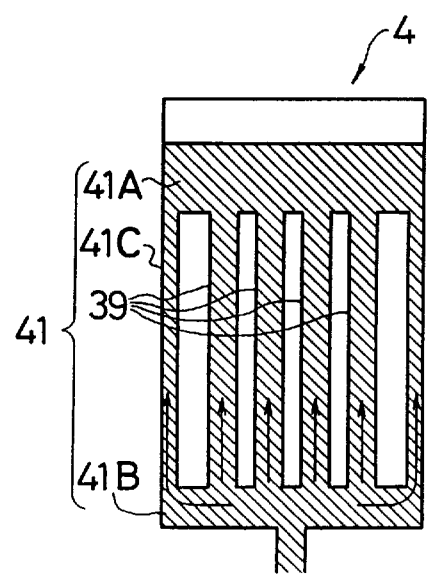
Figure 13B:
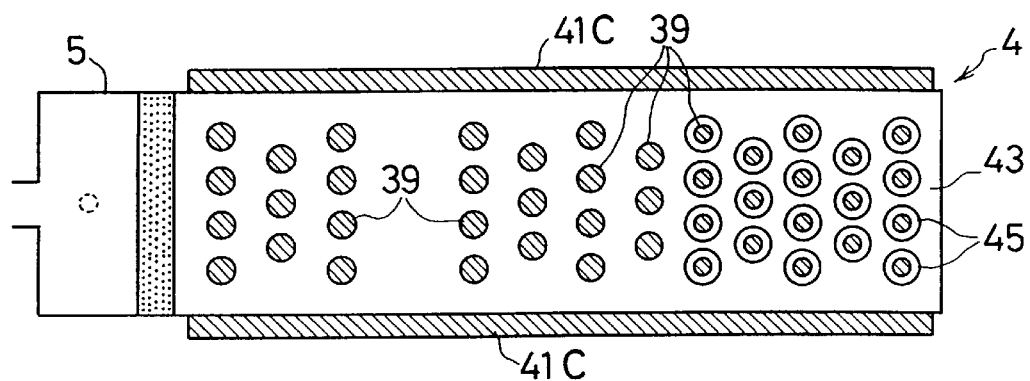
Figure 13C:
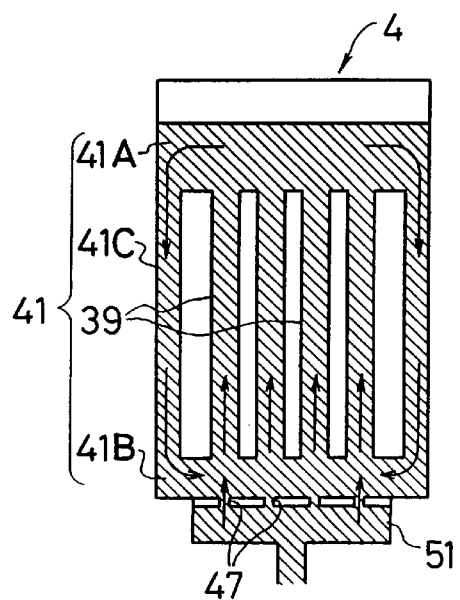

The high-temperature regenerator 4 (FIG. 10A to FIG. 10C) of the seventh embodiment and the high-temperature regenerator 4 (FIG. 8A to FIG. 8C) of the fifth embodiment may be configured such that, as shown in FIG. 11, the branch pipes 6-1 and 6-2 are separated from each other after the low-temperature heat exchanger 7 and before the high-temperature heat exchanger 8 and the branch pipe 6-1 is connected to the solution inlet 47-1 and the branch pipe 6-2 to the solution inlets 47-2, respectively.

According to the above connections, the temperature of the diluted absorption solution flowing in from the solution inlets 47-2 can be further lowered, thereby making it possible to further reduce the temperature of a combustion flame. Therefore, the temperature of the combustion flame can be lowered more sufficiently and the discharge of NOx can be further reduced.

(Eighth Embodiment)

An eighth embodiment of the preset invention is described hereinunder with reference to FIG. 1 and FIG. 12A to FIG. 12C.

The first, second and third groups 37A, 37B and 37C of liquid pipes are separated from one another by partition walls 54a and 54b provided in the double can wall 41 and the flow of the diluted absorption solution is determined by these partition walls.

The diluted absorption solution flowing into the high-temperature regenerator 4 has passed through the heat exchangers 7 and 8 (FIG. 1) and its temperature has fallen below the boiling start temperature in the high-temperature regenerator 4 due to the characteristics of these heat exchangers. The diluted absorption solution having a low temperature flows from the solution inlet 47 above the third group 37C of liquid pipes, making use of the pump pressure of the absorption solution pump P but does not flow into the upper surface portion 41A of the can wall 41 surrounding the second group 37B and the first group 37A of liquid pipes by the function of the partition wall 54a and falls through the liquid pipes 39 of the third group 37C and the side surface portions 41C of the can wall 41 surrounding the third group 37C of liquid pipes. At this point, the diluted absorption solution collects the heat of an exhaust gas to increase its temperature. Thereafter, the diluted absorption solution is guided into a bypass pipe 38 by the function of the partition wall 54a below the liquid pipes 39 of the third group 37C and flows into lower portions of the liquid pipes of the first group 37A. At this point, since the temperature of the diluted absorption solution is elevated to a point near the boiling start point, it boils immediately in the liquid pipes of the first group 37A and its flow is activated by boiling, whereby the heat transfer coefficient is increased. The diluted absorption solution heated sufficiently by the increased heat transfer coefficient is further boiled and concentrated.

A high heat transfer coefficient makes it possible to prevent a rise in temperature in the first group 37A of liquid pipes where inconvenience is liable to occur by a rise in temperature. The diluted absorption solution does not flow into lower portions of the liquid pipes of the second group 37B by the function of the partition wall 54b but runs up through the liquid pipes of the first group 37A. The diluted absorption solution which has run up does not flow into the liquid pipes of the third group 37C by the function of the partition wall 54a but flows into upper portions of the liquid pipes of the second group 37B, falls, reaches lower portions of the liquid pipes of the second group 37B, and flows out to the outside from an unshown discharge portion.

In this embodiment, the diluted absorption solution collects the heat of an exhaust gas while it passes through the liquid pipes of the third group 37C to increase its temperature to a point near the boiling start point. Therefore, it starts boiling immediately in the liquid pipes of the first group 37A and is heated in the liquid pipes of the first group 37A and the second group 37B while it is changed by the temperature of latent heat.

Thus, the diluted absorption solution is heated in the liquid pipes of the first group 37A while it is boiled in this embodiment. In other words, boiling is possible in all of the liquid pipes of the first group 37A. Then, the flow of the diluted absorption solution is activated by boiling, and heat transfer coefficient is increased by this activated flow. Therefore, it is possible to prevent local heating in the liquid pipes of the first group 37A, particularly local heating in lower portions of the liquid pipes of the first group 37A. As a result, a corrosion accident and the crystallization of a solution which are liable to occur in the liquid pipes of the first group 37A can be prevented.

(Ninth Embodiment)

A ninth embodiment of the present invention is described hereinunder with reference to FIG. 1 and FIG. 13A to FIG. 13C.

This ninth embodiment is configured such that the diluted absorption solution is caused to flow into lower portions of the liquid pipes of the first group 37A directly without passing through the liquid pipes of the third group 37C.

In other words, the pump pressure of the absorption solution pump P is used to cause the diluted absorption solution to flow into the lower portions of the liquid pipes of the first group 37A (FIG. 1). The diluted absorption solution supplied by the pump pressure is first guided into the diluted absorption solution inflow box 51 located below the liquid pipes of the first group 37A only.

The diluted absorption solution inflow box 51 communicates with the lower surface portion 41B below the liquid pipes 39 of the first group 37A through the solution inlets 47 which are formed smaller in inner diameter than the liquid pipes 39 of the first group 37A at positions corresponding to the lower portions of the liquid pipes 39 of the first group 37A.

The diluted absorption solution flows vigorously from the solution inlets 47 having a small diameter, making use of the pump pressure and is guided only into the lower portions of the liquid pipes of the first group 37A by the function of the partition wall 54b. In other words, the diluted absorption solution does not flow into the side surface portions 41C of the can wall 41 surrounding the first group 37A of the liquid pipes and lower portions of the liquid pipes of the second group 37B.

The diluted absorption solution which flows vigorously into lower portions of the liquid pipes of the first group 37A reaches upper portions of the liquid pipes and falls vigorously through the side surface portions 41C of the can wall 41. Since the diluted absorption solution is caused to flow vigorously from lower portions of the liquid pipes of the first group 37A, the diluted absorption solution therearound, that is, the diluted absorption solution present in the under surface portion 41B of the can wall 41 communicating with the lower portions of the liquid pipes of the first group 37A is dragged into the above diluted absorption solution and flows into the liquid pipes of the first group 37A. Further, the heated diluted absorption solution flows up in the liquid pipes 39. Owing to these, as shown by arrows in FIG. 13C, the diluted absorption solution forms a large flow as a whole.

Thanks to this flow, the diluted absorption solution is not retained, thereby making it possible to prevent the formation of a portion heated to an extremely high temperature only in a part of the vertical liquid pipe groups. By preventing such a local rise in temperature in this way, even if the pump for flowing in the diluted absorption solution malfunctions, the occurrence of a burn-out can be prevented.

As described above, according to the first aspect of the present invention, since the diluted absorption solution is caused to flow into upper portions of liquid pipes arranged on a side opposite to the burner and is sprinkled in an open state, the sprinkled diluted absorption solution falls through the liquid pipes nearby. The diluted absorption solution in the other liquid pipes, that is, the liquid pipes near the burner, is heated and flows up. In this way, a large circulation flow is formed in the entire high-temperature regenerator. Since the sprinkled diluted absorption solution collects the heat of an exhaust gas while it falls to increase its temperature, when it flows into the other liquid pipes, it boils immediately and its circulation flow is activated by boiling. Therefore, total heat transfer coefficient can be increased, a local rise in the temperature of the liquid pipe groups and the can wall can be avoided, and such inconvenience as a corrosion accident and the crystallization of a solution caused by this rise in temperature can be prevented. Further, the sprinkled diluted absorption solution generates refrigerant vapor, whereby its concentration is promoted.

According to the second aspect of the present invention, since the diluted absorption solution is caused to flow into upper portions of both right and left sides or an upper portion of either one of the sides of a portion on a side opposite to the burner of the double can wall and is sprinkled in an open state, the sprinkled diluted absorption solution falls mainly through the side surface portions of the can wall. Thereafter, the diluted absorption solution in the liquid pipes is heated and flows up. Thus, a large circulation flow is formed in the entire high-temperature regenerator. Since the sprinkled diluted absorption solution collects the heat of an exhaust gas while it falls to increase its temperature, it boils immediately when it circulates in the liquid pipes and its circulation flow is activated by boiling. Therefore, total heat transfer coefficient can be increased and a local rise in the temperatures of the liquid pipes and the can wall can be avoided, and such inconvenience as a corrosion accident and the crystallization of a solution caused by this rise in temperature can be prevented. The sprinkled diluted absorption solution generates refrigerant vapor, whereby its concentration is promoted.

According to the third aspect of the present invention, since the diluted absorption solution is distributed in a longitudinal direction of upper portions of both right and left sides or an upper portion of either one of the sides of the double can wall and is sprinkled in an open state, the sprinkled diluted absorption solution falls through the side surface portions in a longitudinal direction of the can wall. The diluted absorption solution in the liquid pipes is heated and flows up. Thus, a large circulation flow is formed in the entire high-temperature regenerator. Since the sprinkled diluted absorption solution collects the heat of an exhaust gas while it falls to increase its temperature, it boils immediately while it flows into the liquid pipes and its circulation flow is activated by boiling. Therefore, total heat transfer coefficient can be increased, a local rise in the temperatures of the liquid pipes and the can wall can be avoided, and such inconvenience as a corrosion accident and the crystallization of a solution caused by this rise in temperature can be prevented. The sprinkled diluted absorption solution generates refrigerant vapor, whereby its concentration is promoted.

According to the fourth aspect of the present invention, since the diluted absorption solution is caused to flow into lower portions of liquid pipes arranged on the side of the burner by pump pressure, a strong upflow which is joined with an upflow obtained naturally by heating in the liquid pipes can be obtained and a circulation flow of the diluted absorption solution can be formed more positively by this upflow and downflows generated in other portions. Therefore, total heat transfer coefficient can be increased, a local rise in the temperatures of the liquid pipes and the can wall can be avoided, and such inconvenience as a corrosion accident and the crystallization of a solution caused by this rise in temperature can be prevented. The diluted absorption solution flowing into the lower portions of the liquid pipes arranged on the side of the burner can lower the temperature of a combustion flame from the burner positively and reduce the discharge of NOx contained in the combustion gas.

According to the fifth aspect of the present invention, the effects of the first, second and third aspects as well as the effect of the fourth aspect of the present invention can be obtained.

According to the sixth aspect of the present invention, the diluted absorption solution is caused to flow into lower portions of liquid pipes arranged on the side of the burner by pump pressure, is heated, is caused to flow out from upper portions of the liquid pipes, and sprinkled over a plurality of liquid pipes arranged in another portion in an open state, the following effect can be obtained in addition to the effect of the fourth aspect. That is, the generation of refrigerant vapor can be promoted by sprinkling the diluted absorption solution in an open state. The diluted absorption solution having a low temperature can be retained in the liquid pipes arranged on the side of the burner sufficiently, the temperature of a combustion flame can be lowered more sufficiently and the discharge of NOx can be further reduced.

According to the seventh aspect of the present invention, part of the diluted absorption solution which has exchanged heat with the low-temperature heat exchanger or both the low-temperature heat exchanger and the high-temperature heat exchanger is caused to flow in from the first solution inlets by pump pressure, the following effect can be obtained in addition to the effect of the sixth aspect of the present invention. That is, the amount of the diluted absorption solution to be supplied to liquid pipes on the side of the burner can be adjusted, thereby making it possible to control the degree of a reduction in the temperature of a combustion flame.

The diluted absorption solution which has flown in from the first solution inlets and has flown out from upper portions of liquid pipes arranged on the side of the burner is caused to flow into upper portions of liquid pipes arranged on a side opposite to the burner, or upper portions of both right and left sides or an upper portion of either one of the sides of a portion on a side opposite to the burner of the double can wall, or in locations distributed in a longitudinal direction of upper portions of both right and left sides or an upper portion of either one of the sides of the can wall together with the other part of the branching diluted absorption solution and is sprinkled in an open state. Thereby, the effects of the first, second and third aspects of the present invention described above are obtained.

According to the eighth aspect of the present invention, since the diluted absorption solution is caused to pass through the liquid pipes of the third group to collect the heat of an exhaust gas and reach the boiling start temperature, or is caused to pass through the liquid pipes of the first group and the second group after its temperature approximates to the boiling start temperature sufficiently, the flow of the diluted absorption solution can be activated by boiling. Thereby, heat transfer coefficient can be increased, a local rise in the temperatures of the liquid pipe groups and the can wall can be avoided, and such inconvenience as a corrosion accident and the crystallization of a solution caused by this rise in temperature can be prevented.

According to the ninth to twelfth aspects of the present invention, when the diluted absorption solution is caused to flow from lower portions of the liquid pipes of the first group, an upflow is formed positively in the first group of liquid pipes by regulating an inflow into the side surface portions of the double can wall and introducing the diluted absorption solution only into lower portions of the liquid pipes of the first group, whereby the flow of the diluted absorption solution is activated as a whole, thereby making it possible to prevent a local rise in temperature.

What is claimed is:

1. A high-temperature regenerator which has vertical liquid pipe groups in the proximity of which a combustion flame and combustion gas from a burner pass and a double can wall which communicates with upper and lower portions of liquid pipes forming the vertical liquid pipe groups and is arranged at a position of a furnace wall and which heats and concentrates a diluted absorption solution passing through the vertical liquid pipe groups and the double can wall, wherein a solution inlet for sprinkling the diluted absorption solution in an open state is provided above liquid pipes arranged on a side opposite to the burner.

2. A high-temperature regenerator which has vertical liquid pipe groups in the proximity of which a combustion flame and combustion gas from a burner pass and a double can wall which communicates with upper and lower portions of liquid pipes forming the vertical liquid pipe groups and is arranged at a position of a furnace wall and which heats and concentrates a diluted absorption solution passing through the vertical liquid pipe groups and the double can wall, wherein solution inlets for sprinkling the diluted absorption solution in an open state are provided in upper portions of both right and left sides or an upper portion of either one of the sides of a portion on a side opposite to the burner of the double can wall.

3. A high-temperature regenerator which has vertical liquid pipe groups in the proximity of which a combustion flame and combustion gas from a burner pass and a double can wall which communicates with upper and lower portions of liquid pipes forming the vertical liquid pipe groups and is arranged at a position of a furnace wall and which heats and concentrates a diluted absorption solution passing through the vertical liquid pipe groups and the double can wall, wherein solution inlets for sprinkling the diluted absorption solution in an open state are distributed in a longitudinal direction of upper portions of both right and left sides or an upper portion of either one of the sides of the double can wall.

* * * * *